US009232534B2

United States Patent
Eriksson Löwenmark et al.

(10) Patent No.: US 9,232,534 B2
(45) Date of Patent: Jan. 5, 2016

(54) METHODS, MOBILE STATION AND BASE STATION, FOR EXTENDED SHARING OF UPLINK PACKET DATA CHANNELS IN A GSM NETWORK

(75) Inventors: Stefan Eriksson Löwenmark, Hässelby (SE); Paul Schliwa-Bertling, Ljungsbro (SE); Mårten Sundberg, Årsta (SE)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 234 days.

(21) Appl. No.: 13/498,088

(22) PCT Filed: Feb. 13, 2012

(86) PCT No.: PCT/SE2012/050138
§ 371 (c)(1), (2), (4) Date: Mar. 23, 2012

(87) PCT Pub. No.: WO2012/112106
PCT Pub. Date: Aug. 23, 2012

(65) Prior Publication Data
US 2012/0320871 A1    Dec. 20, 2012

Related U.S. Application Data

(60) Provisional application No. 61/444,390, filed on Feb. 18, 2011.

(51) Int. Cl.
*H04W 4/00* (2009.01)
*H04W 72/14* (2009.01)

(52) U.S. Cl.
CPC .................................... *H04W 72/14* (2013.01)

(58) Field of Classification Search
CPC .... H04W 72/042; H04W 72/14; H04W 72/04
USPC ................................................. 370/330, 329
See application file for complete search history.

(56) References Cited

U.S. PATENT DOCUMENTS

| 2012/0023235 A1* | 1/2012 | Hole et al. | 709/226 |
| 2012/0213209 A1* | 8/2012 | Bergstrom et al. | 370/336 |
| 2014/0211719 A1* | 7/2014 | Axelsson et al. | 370/329 |

FOREIGN PATENT DOCUMENTS

| WO | 99/41918 | 8/1999 |
| WO | 02/51177 A1 | 6/2002 |

OTHER PUBLICATIONS

3rd Generation Partnership Project. "GERANIMTC: Discussion on extension of the USF addressing space." 3GPP TSG GERAN #49, GP-110280, Feb. 28-Mar. 4, 2011, pp. 1-6, Chengdu, China.

(Continued)

*Primary Examiner* — Man Phan
*Assistant Examiner* — Nourali Mansoury
(74) *Attorney, Agent, or Firm* — Murphy, Bilak & Homiller, PLLC

(57) ABSTRACT

A method in a mobile station (120) for enabling more than eight mobile stations to share one uplink Packet Data Channel (PDCH) in a GSM network (100) is provided. A combination of Uplink State Flag values in a set of two or more downlink radio blocks is received. The received Uplink State Flag values of the combination are jointly interpreted. Packet data are only transmitted (706; 1402) when an assigned combination of Uplink State Flag values has been received. Conventionally in GSM only a maximum of 8 unique mobile stations can share one PDCH using one timeslot (of eight conventionally available). By the combination of the USF values and joint interpretation thereof, more than 8 unique mobile station can share the same PDCH. Compatibility is also enabled with legacy mobile stations supporting only a single USF value.

16 Claims, 15 Drawing Sheets

(56) References Cited

OTHER PUBLICATIONS

3rd Generation Partnership Project. "New Test Case—58a.2.5 Uplink RTTI TBF/Default PDCH Pair Configuration/Dynamic Allocation/USF Mode Reconfiguration." 3GPP TSG-GERAN WG G3NEW Meeting #40, GP-081894, Miami, FL, US, Nov. 17-21, 2008.

3rd Generation Partnership Project. "GERAN IMTC: Discussion on Identifiers." 3GPP TSG GERAN #48, GP-101953, San Jose Del Cabo, CA, US, Nov. 22-26, 2010.

3GPP, "3rd Generation Partnership Project; Technical Specification Group Core Network and Terminals; Mobile radio interface Layer 3 specification; Core network protocols; Stage 3 (Release 9)", 3GPP TS 24.008 V9.5.0, Dec. 2010, 1-599.

3GPP, "3rd Generation Partnership Project; Technical Specification Group GSM/EDGE Radio Access Network; General Packet Radio Service (GPRS); Mobile Station (MS)—Base Station System (BSS) interface; Radio Link Control / Medium Access Control (RLC/MAC) protocol (Release 9)", 3GPP TS 44.060 V9.6.0, Dec. 2010, 1-601.

3GPP, "3rd Generation Partnership Project; Technical Specification Group GSM/EDGE Radio Access Network; Mobile radio interface layer 3 specification; Radio Resource Control (RRC) protocol (Release 9)", 3GPP TS 44.018 V9.7.0, Dec. 2010, 1-422.

3GPP, "3rd Generation Partnership Project; Technical Specification Group GSM/EDGE Radio Access Network; Multiplexing and multiple access on the radio path (Release 9)", 3GPP TS 45.002 V9.4.0, Sep. 2010, 1-111.

* cited by examiner

| Training sequence (see 3GPP TS 45.002) | bits 11......1 | Packet Channel Access |
|---|---|---|
| TS1 | < EGPRS Packet channel request message content > | EGPRS with 8PSK capability in uplink |
| TS2 | < EGPRS Packet channel request message content > | EGPRS without 8PSK capability in uplink |

```
< EGPRS Packet channel request message content > ::=
  < One Phase Access Request :         0            < MultislotClass : bit (5) >
                                                    < Priority : bit (2) >
                                                    < RandomBits : bit (3) > >
  | < Short Access Request :           100          -- The value 100 was allocated in an earlier version of
the protocol and shall not be used by the mobile station
                                                    < NumberOfBlocks : bit (3) >
                                                    < Priority : bit (2) >
                                                    < RandomBits : bit (3) > >
  | < One Phase Access Request by Reduced Latency MS:   101       <
MultislotClassGroup : bit (3) >
                                                    < Priority : bit (2) >
                                                    < RandomBits : bit (3) > >
  | < Two Phase Access Request :       110000       < Priority : bit (2) >
                                                    < RandomBits : bit (5) > >
  | < Signalling :                     110011       < RandomBits : bit (3) > >
  | < One phase Access Request in RLC unack mode :  110101       < RandomBits : bit (5) > >
  | < Dedicated Channel Request :      110110       < RandomBits : bit (5) > >
  | < Emergency call :                 110111       < RandomBits : bit (5) > >
  | < One Phase Access Request by MS with E-USF :   111          < MultislotClassGroup : bit (3) >
                                                    < Priority : bit (2) >
                                                    < RandomBits : bit (3) > >;
```

Fig. 19

```
< Packet Uplink Assignment > ::=
    { 1
        < TFI_ASSIGNMENT : bit (5) >
        < POLLING : bit >
        0       -- The value '1' was allocated in an earlier version of the
                   protocol and shall not be used.
        < USF : bit (3) >
        < USF_GRANULARITY : bit >
        { 0 | 1  < P0 : bit (4) >
             < PR_MODE : bit (1) > }
        < CHANNEL_CODING_COMMAND : bit (2) >
        < TLLI_BLOCK_CHANNEL_CODING : bit >
        { 0 | 1  < ALPHA : bit (4) > }
        < GAMMA : bit (5) >
        { 0 | 1 < TIMING_ADVANCE_INDEX : bit (4) > }
        { 0 | 1 < TBF_STARTING_TIME : bit (16) > }
      | 0                                          -- Single Block Allocation
        { 0 | 1 < ALPHA : bit (4) > }
        < GAMMA : bit (5) >
        0 1                                        -- See note
        < TBF_STARTING_TIME : bit (16) >
        { L | H  < P0 : bit (4) >
            0       -- The value '1' was allocated in an earlier version of the protocol
                       and shall not be used.
            < PR_MODE : bit (1) > )
    }
    { null | L
  -- Receiver compatible with earlier release
        | H
  -- Additions for R99
        { 0 | 1 < Extended RA : bit (5) > }
    }
    { null | L
        -- Receiver compatible with earlier release
        | H
        -- Additions for Rel-6
        { 0 | 1 < PFI : bit (7) > }
    }
    { null | L                                    -- Receiver compatible with
  earlier release
        | H                                       -- Additions for Rel-x
        { 0 | 1 < USF_EXT : bit (3) > }
    } ;
```

Fig. 20

METHODS, MOBILE STATION AND BASE STATION, FOR EXTENDED SHARING OF UPLINK PACKET DATA CHANNELS IN A GSM NETWORK

TECHNICAL FIELD

Embodiments herein relate to a method in a mobile station, a method in GSM network, a mobile station and a GSM network. In particular, embodiments herein relate to sharing of uplink Packet Data Channels, PDCHs, in a GSM network.

BACKGROUND

Communication devices such as Mobile Stations (MS) are also known as e.g. mobile terminals, wireless terminals and/or user equipment. A mobile station is enabled to communicate wirelessly in a cellular communications network, wireless communications system, or radio communications system, sometimes also referred to as a cellular radio system, cellular network or radio access network (RAN), to mention some examples. The communication may be performed e.g. between two mobile stations and between a mobile station and a regular telephone.

The mobile station may further be referred to as a mobile telephone, cellular telephone, laptop, Personal Digital Assistant (PDA), tablet computer, surf plate, just to mention some further examples. The mobile station in the present context may be, for example, portable, pocket-storable, hand-held, computer-comprised, or vehicle-mounted mobile devices, enabled to communicate voice and/or data, via the RAN, with another entity, such as another mobile station or a server.

The cellular communications network covers a geographical area which is divided into cell areas, wherein each cell area being served by a Base Station (BS), which sometimes may be referred to as Radio Base Station (RBS), Base Transceiver Station (BTS), just to mention some examples. The base stations may be of different classes based on transmission power and thereby also cell size. A cell is the geographical area where radio coverage is provided by the base station at a base station site. Further, each base station may support one or several communication technologies. The base stations communicate over the air interface operating on radio frequencies with the mobile station within range of the base stations.

Several base stations may be connected, e.g. by landlines or microwave, to a radio network controller, e.g. a Base Station Controller (BSC) in GSM. GSM is an abbreviation for Global System for Mobile Communications (originally: Groupe Special Mobile). The BSC may supervise and coordinate various activities of the plural base stations connected thereto.

When nothing else is indicated, the expression downlink (DL) generally refers to transmission from the base station to the mobile station and the expression uplink (UL) generally refers to transmission in the opposite direction i.e. from the mobile station to the base station.

In General Packet Radio Service (GPRS), Enhanced GPRS (EGPRS) and EGPRS phase 2 (EGPRS2), the packet data bearers of the GSM radio access network, data connections for several users are multiplexed onto shared channels, aka Packet Data Shared Channels (PDCHs). A PDCH is a physical channel using one timeslot in each Time Division Multiple Access (TDMA) frame on the radio interface. Four consecutive timeslots on the PDCH (sent in four consecutive TDMA frames) form a radio block. The radio block is the smallest entity that can be used for transmission and reception of data for a GPRS/EGPRS/EGPRS2. In the downlink, each radio block is addressed to a particular MS. Similarly, in uplink a particular mobile station is allowed to transmit during a given radio block. The duration of a radio block is approximately 20 ms.

The TDMA frame of GPRS/EGPRS/EGPRS2 has eight timeslots. Therefore, up to eight PDCHs can be transmitted in parallel on one GSM carrier. Radio blocks, one for each PDCH, that is, one for each of the eight TDMA frame timeslots, numbered 0-7, are schematically illustrated in FIG. 1. Units along a horizontal axis in FIG. 1 is thus TDMA frame timeslot and unit along a vertical axis is thus radio block periods. Mobile stations with multislot capability may transmit and/or receive several PDCHs in parallel.

The multiplexing of mobile stations on the uplink is controlled by the network as follows. In each downlink radio block, an mobile station address field is transmitted. This is known as the Uplink State Flag (USF). For a given PDCH, each MS has been given a unique USF value. When that USF value is received by the mobile station on a downlink PDCH it has been assigned, it is allowed to transmit during the next radio block on the corresponding uplink PDCH. If USF granularity is used (signaled to the MS when it was assigned the PDCH), the mobile station is also allowed to transmit during the three subsequent radio blocks on the same PDCH, i.e., in total during four radio blocks.

This multiplexing method is referred to as Dynamic Allocation (DA) and is illustrated by examples in FIG. 2 and FIG. 3.

For example, in FIG. 2 mobile station MS X has been assigned USF value 1. This USF value is transmitted on downlink timeslot 2 during radio block period N and allows MS X to transmit a radio block on the corresponding uplink timeslot during next radio block period N+1. Units along horizontal and vertical axis in FIG. 2 corresponds to what was shown and discussed above in connection with FIG. 1. Mobile station MS Y has been assigned USF value 2. This USF value is transmitted on timeslot 3 and allows MS Y to transmit a radio block on uplink timeslot 3. In FIG. 3 MS X has been assigned USF value 1. This USF value is transmitted on downlink timeslot 2 and allows MS X to transmit four consecutive radio blocks on the corresponding uplink timeslot. MS Y has been assigned USF value 2. This USF value is transmitted on timeslot 3 and allows MS Y to transmit four consecutive radio blocks on uplink timeslot 3.

Sometimes it is necessary to use an extension to this multiplexing method, called Extended Dynamic Allocation (EDA). This is similar to DA, with the difference that when an MS receives its assigned USF value on a given PDCH, it is allowed to transmit not only on the corresponding uplink PDCH, but also on all uplink PDCHs it has been assigned with higher timeslot numbers in the TDMA frame. USF granularity may be used also together with EDA. For example, in FIG. 4 mobile station MS X is assigned USF value 1 and uplink timeslots 2, 3 and 4. This USF value is transmitted on downlink timeslot 2 and allows MS X to transmit a radio block on each of uplink timeslots 2, 3 and 4.

The existing solutions are described in further detail in 3GPP TS 44.060 "RLC/MAC protocol", where multiplexing principles are described in clause 5.2 and DA and EDA in clause 8.1.1, and in 3GPP TS 45.002 "Multiplexing and multiple access on the radio path", where clause 6.3.2.2.1 describes DA and EDA to some extent.

The USF is a three bit field and hence it can address eight unique mobile stations per PDCH.

With an increasing amount of users, devices to be provided with internet access and in order to realize the vision of "50 billion" users, it is desirable or even necessary to be able to multiplex many mobile stations on each PDCH. However, since the USF can only address eight unique mobile stations, no more than eight mobile stations can share one uplink PDCH.

SUMMARY

It is therefore an object of embodiments herein to enable more than eight mobile stations to share one uplink Packet Data Channel (PDCH).

According to a first aspect of embodiments herein, the object is achieved by a method in a mobile station for enabling more than eight mobile stations to share one uplink Packet Data Channel in a GSM network. The GSM network comprises the mobile station. The mobile station receives a combination of Uplink State Flag values in a set of two or more downlink radio blocks. The mobile station then jointly interprets the received Uplink State Flag values of the combination, and transmits packet data only when an assigned combination of Uplink State Flag values has been received.

According to a second aspect of embodiments herein, the object is achieved by a method in a GSM network for enabling more than eight mobile stations to share one uplink Packet Data Channel in the GSM network. The GSM network comprises a mobile station. The GSM network sends to the mobile station a combination of Uplink State Flag values in a set of two or more downlink radio blocks, the Uplink State Flag values of the combination to be jointly interpreted by the mobile station. The GSM network then receives packet data from the mobile station in response to that the mobile station has received and jointly interpreted the sent Uplink State Flag values of the combination and transmitted the packet data only when an assigned combination of Uplink State Flag values was received. According to a third aspect of embodiments herein, the object is achieved by a mobile station for enabling more than eight mobile stations to share one uplink Packet Data Channel in a GSM network. The GSM network comprises the mobile station. The mobile station is configured to receive a combination of Uplink State Flag values in a set of two or more downlink radio blocks. The mobile station is further configured to jointly interpret the received Uplink State Flag values of the combination, and transmit packet data only when an assigned combination of Uplink State Flag values has been received.

According to a fourth aspect of embodiments herein, the object is achieved by a GSM network for enabling more than eight mobile stations to share one uplink Packet Data Shared Channel in the GSM network. The GSM network comprises a mobile station. The GSM network is configured to send, to the mobile station, a combination of Uplink State Flag values in a set of two or more downlink radio blocks, the Uplink State Flag values of the combination to be jointly interpreted by the mobile station. The GSM network is further configured to receive packet data from the mobile station in response to that the mobile station has received and jointly interpreted the sent Uplink State Flag values of the combination and transmitted the packet data only when an assigned combination of Uplink State Flag values has been received.

As mentioned in the background, GSM conventionally offers 3 bits for each Uplink State Flag, USF, value, that is, 8 unique values are possible and thereby conventionally only a maximum of 8 unique mobile stations can share one PDCH using one timeslot (of the eight that are conventionally available) in a TDMA frame of GSM. According to embodiments herein, by the combination of the USF values received in the set of two or more downlink radio blocks, instead at least 3+3 bits are available for the joint interpretation, thus up to 64 unique mobile stations may share the corresponding uplink radio blocks and the respective uplink PDCH associated with each such radio block. In case of only a subset of corresponding uplink radio blocks being used, the sharing can be further split between the uplink radio blocks and thus even more mobile stations may share one uplink PDCH.

Embodiments herein thus extend sharing of uplink PDCHs and enable more than eight mobile stations to share one uplink PDCH.

BRIEF DESCRIPTION OF THE DRAWINGS

Examples of embodiments herein are described in more detail with reference to the appended schematic drawings, in which:

FIG. 19 is an example of modification to the "EPGR Packet Channel Request" message for E-USF capability signalling.

FIG. 20 is an example of modification to the 3GPP TS 44.018 "Packet Uplink Assignment" message for informing about assigned E-USF.

DETAILED DESCRIPTION

Figure 1:
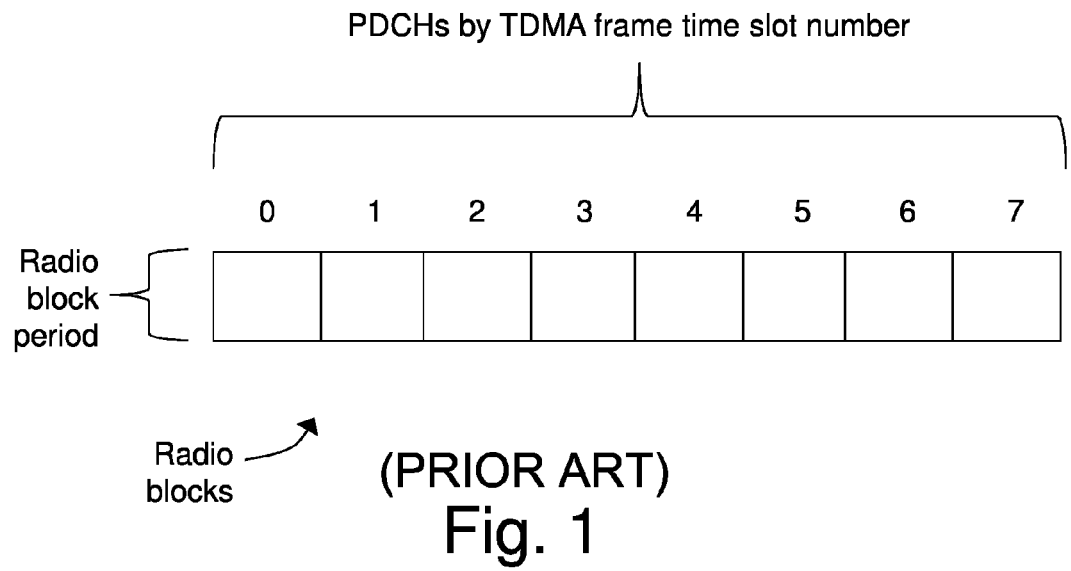
FIG. 1 illustrates the relation between PDCH, TDMA frame timeslots and radio blocks.
Figure 2:
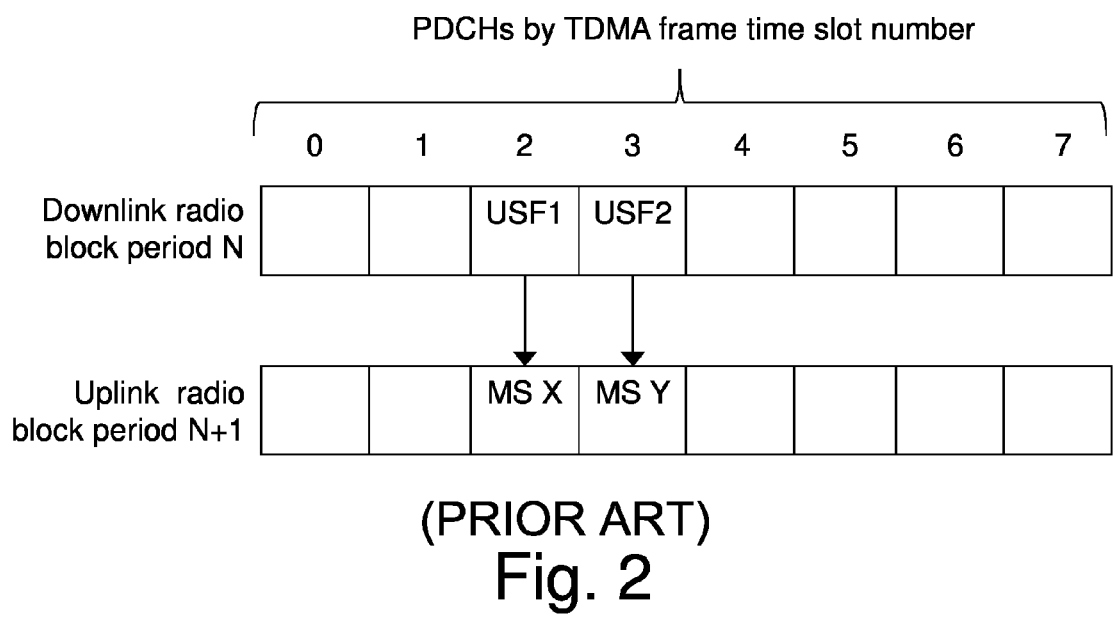
FIG. 2 illustrates dynamic allocation multiplexing.
Figure 3:
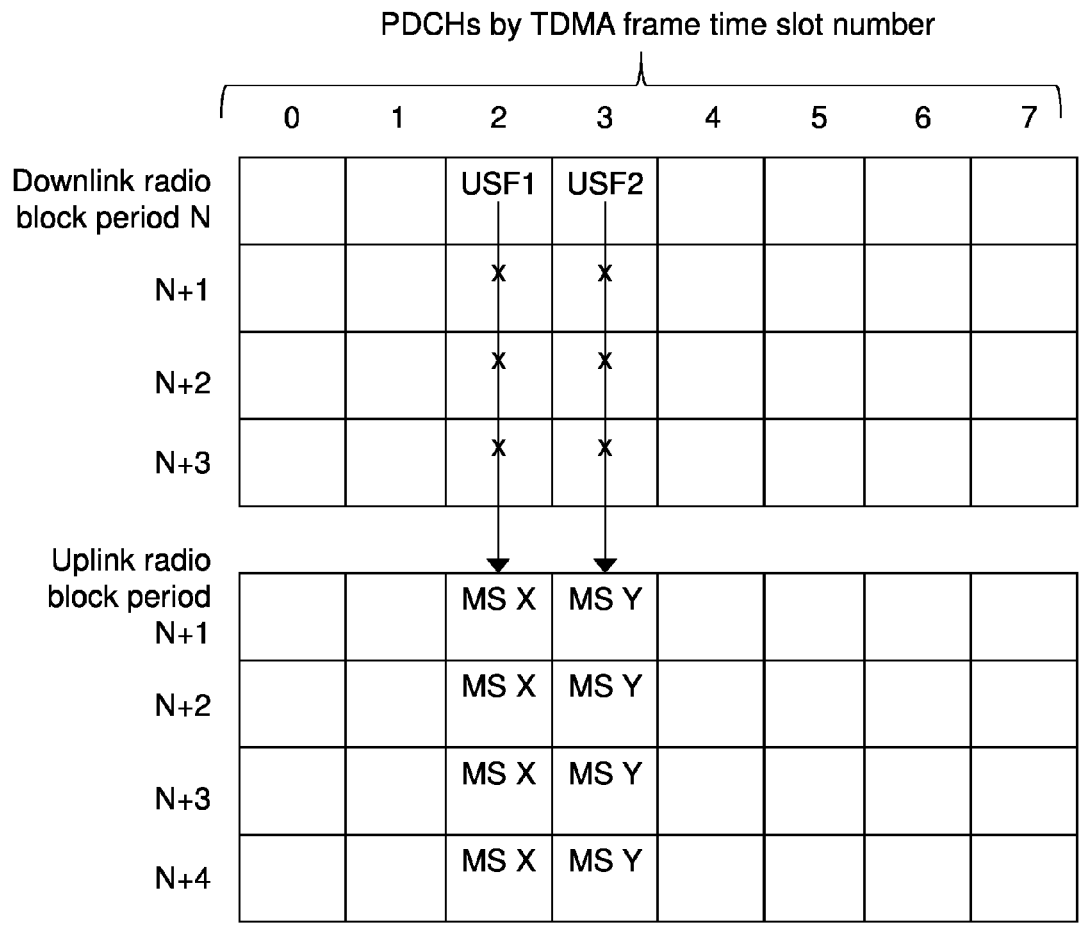
FIG. 3 illustrates dynamic allocation multiplexing with USF granularity.
Figure 4:
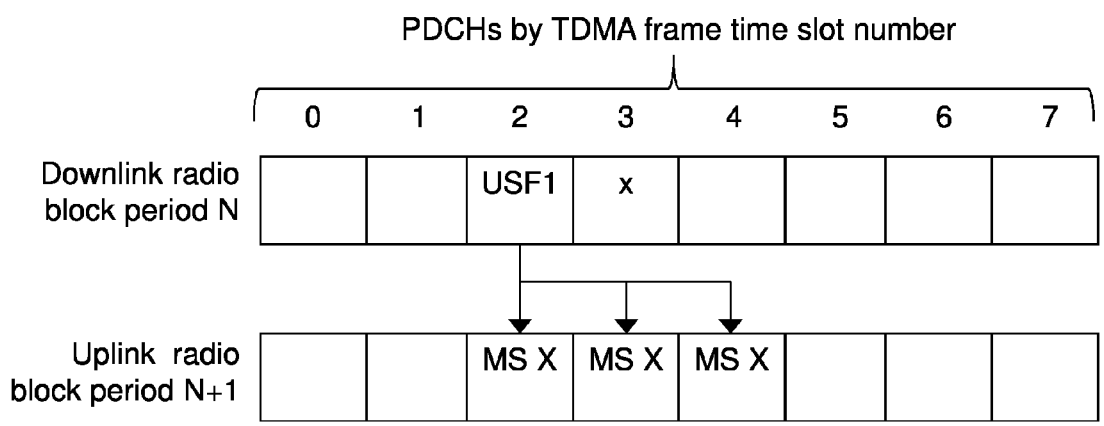
FIG. 4 shows extended dynamic allocation multiplexing.
Figure 5:
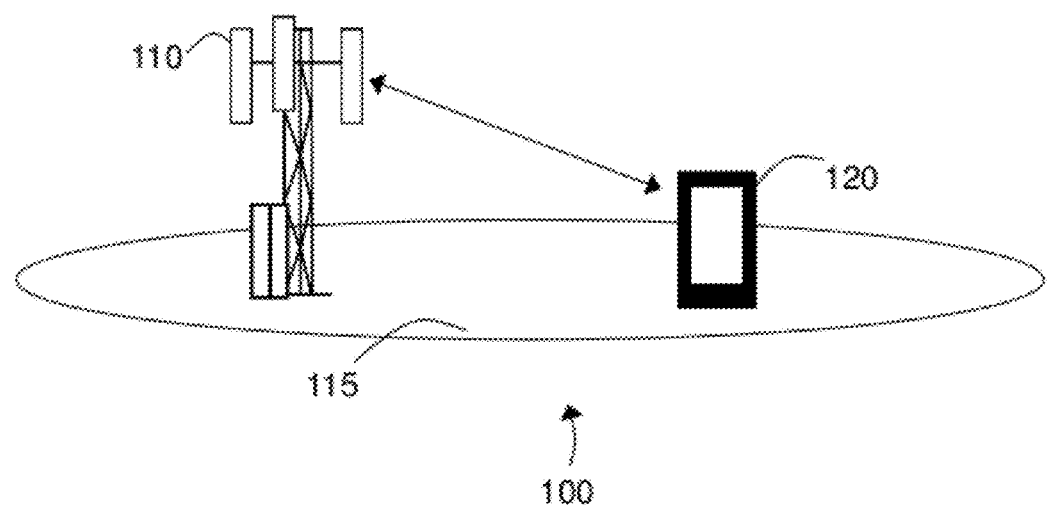
FIG. 5 is a schematic block diagram illustrating a GSM network.

FIG. 5 schematically depicts an example of a GSM network 100, which is a cellular radio communications network, which may also be referred to as a GSM radio access network. The shown GSM network 100 comprises a base station 110 serving a cell 115. By a base station serving a cell is here meant the ability to wirelessly send downlink data and/or receiving uplink data via radio communication in the cell to a mobile station comprised therein. The shown GSM network 100 further comprises a mobile station 120 located in the cell 115.

It should be understood that FIG. 5 is merely schematic and that the GSM network 100 in reality may comprise several further base stations, mobile stations, and other network nodes, including Base Station Controllers (BSCs), which are not shown in FIG. 5.

It should further be understood that the mobile station 120 is connected to the GSM network 100 via the base station serving the mobile station 120 in the cell 115, and that the base station 110 is at least partly controlled by a Base Station Controller (BSC) not shown, and which typically control also other base stations in the in GSM network 100.

One aspect of embodiments herein is a method in the mobile station 120 for enabling more than eight mobile stations to share one uplink Packet Data Channel (PDCH) in the GSM network 100. The GSM network 100 comprises the mobile station. The mobile station 120 receives a combination of Uplink State Flag (USF) values in a set of two or more downlink radio blocks. The mobile station 120 then jointly interprets the received USF values of the combination, and transmits packet data only when an assigned combination of USF values has been received.

Packet Data Shared Channel (PDCH), Uplink State Flag (USF) and radio block are expressions that shall be well recognized by and have a clear and concise meaning to the person skilled in GSM and in particular the packet data bearers of GSM, including General Packet Radio Service (GPRS), Enhanced GPRS (EGPRS) and EGPRS phase 2 (EGPRS2). For example: PDCH refers to a physical channel using one timeslot in each Time Division Multiple Access, TDMA, frame on a radio interface. A PDCH thus corresponds to a TDMA timeslot. A radio block is formed of four consecutive timeslots on a PDCH, sent in four consecutive TDMA frames.

As mentioned in the background, GSM conventionally offers 3 bits for each Uplink State Flag, USF, value, that is, 8 unique values are possible and thereby conventionally only a maximum of 8 unique mobile stations can share one PDCH using one timeslot (of the eight that are conventionally available) in a TDMA frame of GSM. According to embodiments herein, by the combination of the USF values received in the set of two or more downlink radio blocks, instead at least 3+3 bits are available for the joint interpretation, thus up to 64 unique mobile stations may share the corresponding uplink radio blocks and the respective uplink PDCH associated with each such radio block. In case of only a subset of corresponding uplink radio blocks being used, the sharing can be further split between the uplink radio blocks and thus even more mobile stations may share one uplink PDCH.

A clarifying example: Two USF values are sent on a PDCH in two consecutive downlink radio blocks. The joint interpretation of the 6 bit USF value combination enables 64 unique values where each value can be assigned to a respective mobile station listening to the PDCH. Thus 64 different mobile stations can share the same PDCH when packet data are sent on corresponding two uplink radio blocks. However, a mobile station assigned one of the 64 unique values may send on only a subset, that is, here one, of the corresponding two uplink radio blocks, and another mobile station assigned the same one of the 64 unique values may send on the other one of the corresponding two uplink radio blocks, thus enabling 128 different mobile stations to share one uplink PDCH.

Embodiments herein thus extend sharing of uplink PDCHs and enable more than eight mobile stations to share one uplink PDCH.

Figure 6:
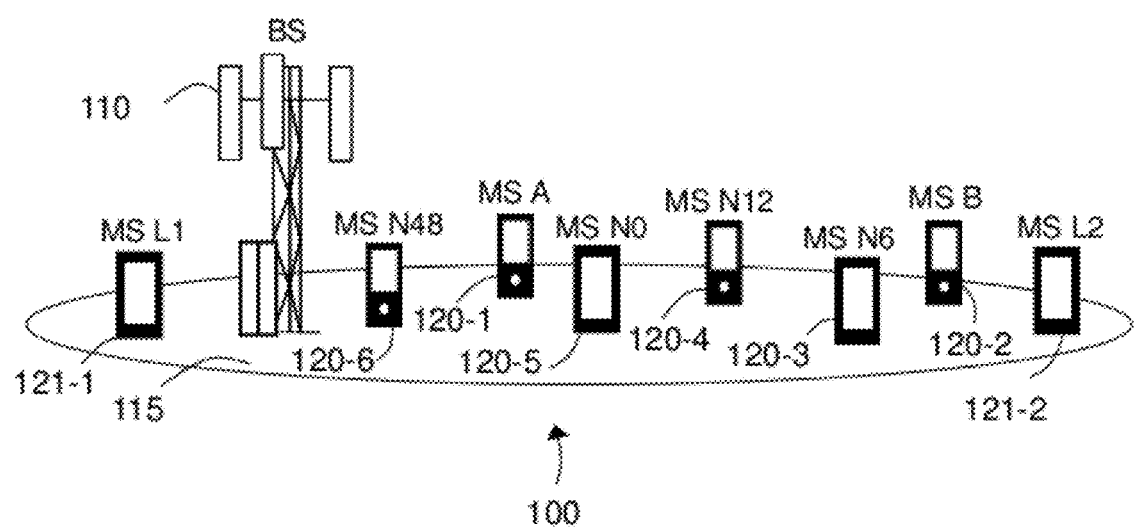
FIG. 6 is a schematic block diagram illustrating the GSM network with multiple mobile stations in one cell thereof.

FIG. 6 schematically depicts another example of the GSM network 100, in a situation with multiple mobile stations 120-1-120-6 and 121-1, 121-2 located in the cell 115. Some mobile stations 120-1-120-6, denoted MS NS, are mobile stations according to embodiments herein, that is, mobile stations supporting joint interpretation of a combination of USF values, hereinafter also referred to as coupled USFs or Extended USF (E-USF), which may coexist and be used simultaneously in the GSM network and in the cell 115 with mobile stations 121-1, 121-2, denoted MS LS, which refer to legacy mobiles stations. It will below be reverted to the mobile stations shown in FIG. 6.

By legacy mobile station is here referred to a conventional mobile station that does not support joint interpretation of the combination of USF values, in contrast to mobile stations according to embodiments herein.

A further advantage with embodiments herein is that they enable backwards compatibility with legacy mobile stations such as 121-1, 121-2, which thereby may coexist and share PDCHs with mobile stations according to embodiments herein.

A basic concept of embodiments herein is to couple (i.e., jointly interpret) the USFs transmitted in two (or more) downlink radio blocks, each mobile station is given a combination of USF values and is allowed to transmit only when it receives that USF combination in a predefined set of downlink radio blocks.

In some embodiments the predefined set of radio blocks can be received on two (or more) parallel PDCHs (i.e. PDCHs on different timeslots in the TDMA frame) during the same 20 ms radio block period or on two (or more) consecutive radio blocks on the same PDCH.

In some embodiments the predefined set of radio blocks is received on a combination of parallel PDCHs and consecutive radio blocks.

In embodiments herein the mobile station 120 is allowed to transmit on all or only on a subset of the corresponding uplink radio blocks. More USF combinations can be assigned to the same mobile station, allowing the mobile station to transmit on different subsets of the corresponding uplink radio blocks (e.g., if two USFs are coupled, three different USF combinations can give permission to send in the first, second and both of the corresponding uplink radio blocks, respectively).

To enable multiplexing with mobile stations supporting only the legacy methods, and to avoid collisions in the uplink, the assignment of USFs to legacy mobile stations and USF combinations to mobile stations according to embodiments herein may be coordinated so that USF combinations that comprise USF values are also assigned to legacy mobile stations.

One advantage with coupled USF, also referred to as combination of USF values for joint interpretation or Extended USF (E-USF), as in embodiments herein, is that more GPRS/EGPRS/EGPRS2 mobile stations can be multiplexed onto the same uplink timeslots. Another advantage is that it is backwards compatible, i.e., that mobile stations supporting coupled USF and mobile stations not supporting it can be multiplexed onto the same timeslots.

Figure 7:
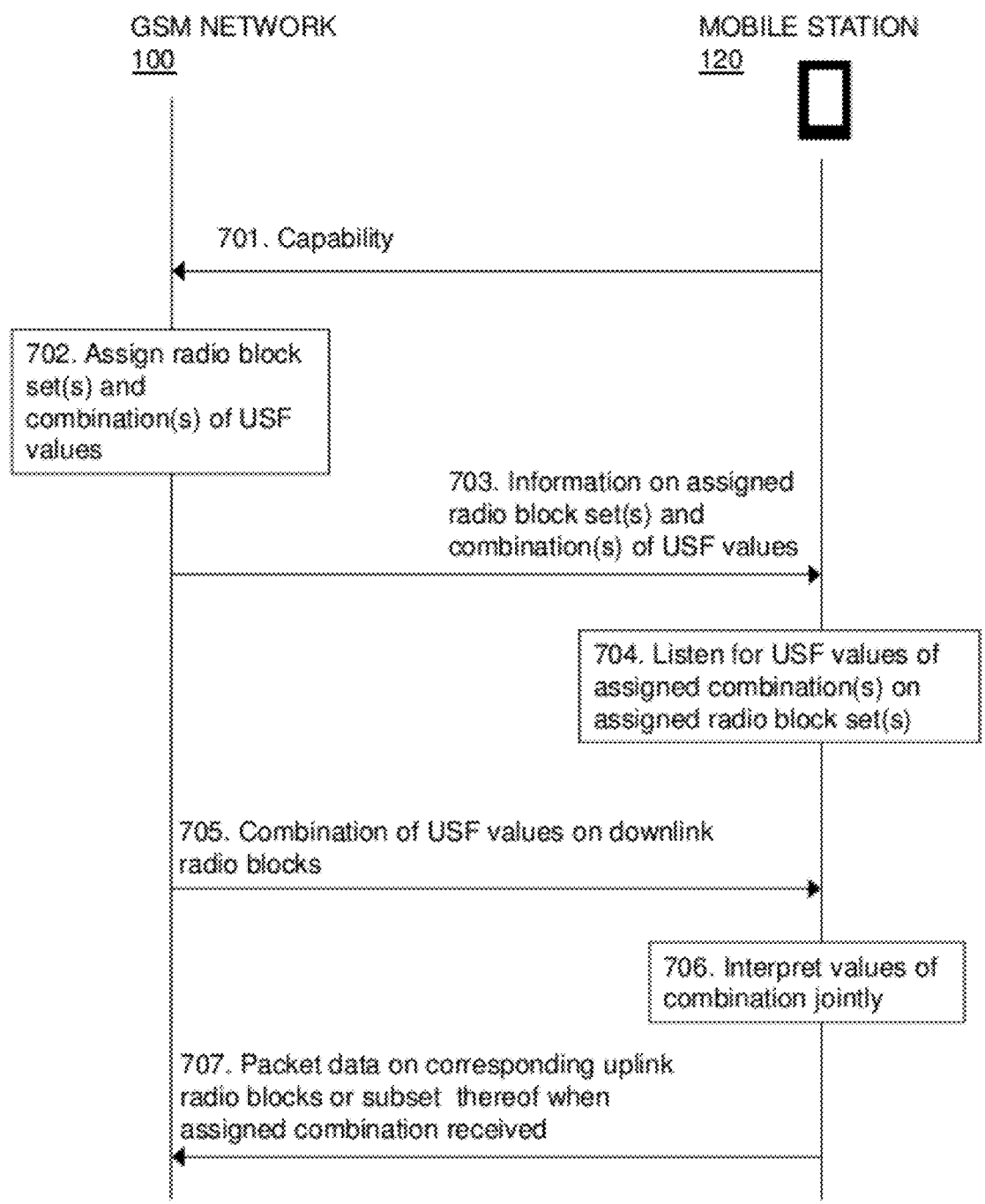
FIG. 7 is a schematic block diagram showing embodiments in a GSM network.

Embodiments herein for enabling more than eight mobile stations to share one uplink Packet Data Channel in a GSM network will now be described in further detail with reference to the combined signaling diagram and flowchart depicted in FIG. 7.

Action 701

The mobile station 120 transmits its capability to the GSM network 100. This in order for the GSM network 100 to be able to identify a mobile station, such as the mobile station 120, supporting joint interpretation of a combination of USF values, which hereinafter may be referred to as coupled USFs or Extended USF (E-USF), and be able to assign PDCHs accordingly.

If every mobile station in the GSM network 100 supports E-USF and the GSM network 100 is aware of this, the present action has less or even no purpose, however, when it is desirable that legacy mobile stations shall be supported simultaneously by the GSM network 100, capability signalling as in this action allows identification of which mobile stations are supporting E-USF and thereby also which are not. The GSM network is then able to handle these accordingly, including assignment of uplink radio blocks and USF values, as will be further discussed below.

Hence, to assign an E-USF to the mobile station 120, the GSM network 100 should be aware that this feature is actually supported by the mobile station 120. This can e.g. be accomplished by adding a new E-USF capability indication to a "MS Radio Access capability Information Element" according to the 3GPP TS 24.008, clause 10.5.5.12a. A more detailed example in this regard is given under "Detailed example 1" below, at the end of the description.

The mobile station 120 is e.g. indicating its E-USF capability to the GSM network 100 at an access procedure, i.e. when requesting radio resources for uplink transmission. During a Two Phase Access procedure (see 3GPP TS 44.018, clause 3.5.2) this may e.g. be accomplished by the GSM network 100 acquiring the mobile station E-USF capability from an "ADDITIONAL MS RADIO ACCESS CAPABILITIES" message containing the "MS Radio Access Capability Information Element" as described above. During a One Phase Access procedure (see 3GPP TS 44.018, clause 3.5.2 this may e.g. be accomplished by the mobile station 120 indicating its support for E-USF by using one or more of the following approaches:

- Use of a new burst format for a 3GPP TS 44.060, clause 11.2.5a, "EGPRS PACKET CHANNEL REQUEST" message.
- Use of new training sequence at transmission of a 3GPP TS 44.060, clause 11.2.5a, "EGPRS PACKET CHANNEL REQUEST" message.
- Modify the contents of a 3GPP TS 44.060. clause 11.2.5a, "EGPRS PACKET CHANNEL REQUEST" message. A more detailed example how this can be done is given under "Detailed example 2" below, at the end of the description.

Action 702

The GSM network 100, typically the BSC, assign radio block set(s) and assigns combination(s) of USF values to the mobile station 120. This may be correspondingly be performed for other mobile stations in the cell of the base station 110 and which mobile stations have requested resources for uplink packet data transmission. From the previous action, the GSM network 120 has information which of these, including the mobile station 120, that support E-USF, and thus also knows which mobile stations that do not support this (legacy mobile stations). The GSM network 100 should thus assign resources to the requesting mobile stations, including assigning combination or combinations of USF values to the mobile station 120, and such mobile stations that support E-USF, and single USF values to legacy mobile stations.

An example of an assignment and interpretation table that may be formed in this action will be discussed in some detail below with reference to FIG. 8.

It may be recalled that the basic principle in conventional handling of a single USF value is that a mobile station upon receipt of its assigned USF value on an assigned downlink PDCH, that is, receipt of its assigned USF value on a downlink radio block, is allowed to transmit on the corresponding PDCH in the next radio block period, that is, transmit on a corresponding uplink radio block.

According to embodiments herein, it is instead the downlink radio block set of two or more downlink radio blocks on which the USF values of the combination are received that determines uplink radio blocks for the mobile station. The uplink radio blocks may correspond to the whole downlink radio block set, but it is also possible to use only a subset thereof. See for example the table of FIG. 8 discussed below, where only one of two uplink radio blocks are used by the mobile stations of group 804.

In addition to informing a mobile station 120 about its assigned combination of USF value, information on which (all or subset) of corresponding uplink radio blocks to use according to the table should also be communicated to the mobile station 120. This is taken care of by the following action.

Action 703

The GSM network 100 informs, through the base station 110, the mobile station 120 about its assigned combination of USF values for joint interpretation, that is, the E-USF, and the downlink radio block set, or sets, where the assigned E-USF will be sent.

Signalling of the assigned E-USF to the mobile station 120, or in general an assigned E-USF to a mobile station supporting such, may e.g. be accomplished through one or more of 3GPP TS 44.060, clause 11.2.29, PACKET UPLINK ASSIGNMENT, 3GPP TS 44.060, clause 11.2.29a, MULTIPLE TBF UPLINK ASSIGNMENT, 3GPP TS 44.060, clause 11.2.31, PACKET TIMESLOT RECONFIGURE, 3GPP TS 44.060, clause 11.2.31a, MULTIPLE TBF TIMESLOT RECONFIGURE, 3GPP TS 44.060, clause 11.2.43, PS HANDOVER COMMAND, 3GPP TS 44.018, clause 10.5.2.16, PACKET UPLINK ASSIGNMENT and 3GPP TS 44.018, clause 10.5.2.25c, RR PACKET UPLINK ASSIGNMENT.

Each such message may be updated to include at least one additional USF value, denoted here as USF_EXT. The USF_EXT is preferably a 3 bit field following the coding of legacy USF, that is, following the coding of a conventional USF value.

To be able to request the mobile station 120 to use a subset of uplink radio blocks, corresponding to the downlink radio blocks on which USF values of the E-USF will be sent, each such message may also describe an uplink allocation pattern, denoted here USF_ALLOC.

For increased scheduling flexibility, multiple instances of (USF, USF_EXT, USF_ALLOC) may be sent to one mobile station, for reasons that will be described below in connection with FIG. 8, where some mobile stations are assigned more than one combination of USF values, that is, more than one E-USF.

There are two cases that should be distinguished, namely when the mobile station 120 is to be assigned a single uplink time slot for an uplink Temporary Block Flow (TBF) and when the mobile station 120 is to be assigned multiple time slots for an uplink TBF.

In case of multiple time slots assignment, the mobile station should be provided the combination of USF values per assigned time slot, in the case of combination of USF values on consecutive radio blocks on one PDCH, or assigned time slot couple, in the case of combination of USF values on parallel PDCHs. The two cases will be discussed in further detail below.

The USF_ALLOC is preferably a 2 bit field used by the mobile station to interpret the combination of USF values (such as one legacy USF value and one USF_EXT value) of the E-USF with regard to the uplink transmission opportunity, where the two bits may be interpreted according to the following:

0 0: The mobile station 120 has been allocated uplink transmission opportunity on the lower numbered time slot.

0 1: The mobile station 120 is allocated uplink transmission opportunity on the higher numbered time slot.

1 0: The mobile station 120 is allocated uplink transmission opportunity on both time slots.

1 1: Indicates to the mobile station 120 that reception of [USF, USF_EXT] on the assigned time slot(s) allocates uplink transmission opportunity on the lower assigned time slot while the reception of the combination [USF_EXT,USF] allocates an uplink transmission opportunity on the higher assigned time slot.

Alternatively, the USF_ALLOC field value '1 1' could have the following interpretation:

1 1: Indicates to the mobile station 120 that reception of [USF,USF_EXT] on the assigned time slot(s) allocates uplink transmission opportunity on the lower assigned time slot while the reception of the combination [USF_EXT,USF] allocates an uplink transmission opportunity on both time slots.

Referring to higher and lower number timeslots as in the above examples may be construed as referring to the case when the USF values of the combination are sent on parallel PDCHs (different time slots) in the same radio block period. However, as should be understood, the underlying principle is the same also for the case when the USF values of the combination are sent on the same PDCH (timeslot) on two consecutive radio block periods. More general denominations that could be used, instead of radio block of lower time slot and radio block of higher time slot as in the examples, are first radio block and second radio block respectively.

Some of the above mentioned messages for signalling of the assigned E-USF are suitable only in the case of a single uplink timeslot and other may be used also for the case of multiple uplink timeslots. The 3GPP TS 44.018, clause 10.5.2.16, "PACKET UPLINK ASSIGNMENT" message is limited to the assignment of a single time slot and thus for assigning an E-USF that is to be received by the mobile station 120 as a combination of two coupled USFs in two radio blocks on consecutive radio block periods. A more detailed example on how this message may be modified to include one more USF value is given under "Detailed example 3" below, at the end of the description.

Similar changes may be introduced in the other messages if/when these are to be used. For example, in the 3GPP TS 44.060, clause 11.2.29, "PACKET UPLINK ASSIGNMENT" message, USF values are basically listed from timeslot 0 to 7, with a switch (0|1) for each USF to indicate sending of USFs only for the assigned PDCHs (timeslots) according to:

{0|1<USF_TN0:bit (3)>}
{0|1<USF_TN1:bit (3)>}
{0|1<USF_TN2:bit (3)>}
{0|1<USF_TN3:bit (3)>}
{0|1<USF_TN4:bit (3)>}
{0|1<USF_TN5:bit (3)>}
{0|1<USF_TN6: bit (3)>}
{0|1<USF_TN7: bit (3)>}

For instance, if the mobile station 120 is to be assigned USF=1 (001) on timeslot 2 and USF=2 (010) on timeslot 2, the part of the message containing the USFs would look like:

0
1 001
1 010
0
0
0
0
0

This may be interpreted by the mobile station 120 as it has been assigned the combination of USF values 1 and 2 on (parallel) PDCHs (timeslots) 1 and 2 respectively.

Action 704

The mobile station 120 listens for the USF values of the assigned combination on one or more PDCH(s), i.e. timeslot(s), according to what the mobile station 120 was assigned and informed about in Action 703. Or in other words, the mobile station 120 listens on the downlink radio block set, or sets, where the assigned combination of USF values (the E-USF) will be sent.

Action 705

The GSM network 100 sends, by means of the base station 110, a combination of USF values on downlink radio blocks to the mobile station 120. When the combination of USF values and the downlink radio blocks corresponds to those assigned to the mobile stations 120, this signals to the mobile station 120 that uplink resources have been allocated and that the mobile station 120 is allowed to transmit during the next radio block period. This is similar to the situation discussed in the background for the conventional situation but here this is signaled by the assigned combination of USF values (the E-USF), which the mobile station 120 is listening for, instead of a single USF value that a legacy mobile station would be listening for. Or in other words, the mobile station receives the assigned combination of USF values (the E-USF) in a set of two or more downlink radio blocks. How the radio blocks may be sent, which also determines how the mobile station in response thereto will send packet data on the uplink, is discussed in further detail below in connection with FIGS. 9-13.

Action 706

After having received the combination of USF values, the mobile station 120 interprets the received USF values jointly.

Action 707

When the assigned combination of USF values is received, the mobile station 120 transmits packet data on corresponding uplink radio blocks or a subset thereof, that is, uplink radio blocks or subset thereof corresponding to the downlink radio blocks on which the assigned combination of USF values were received. This is thus in response to received USF values corresponding to the assigned combination of USF values (the E-USF). In general, as mentioned above, the uplink resources are uplink radio blocks corresponding to the downlink radio blocks on which the combination of the USF values were received (see Action 705). As already discussed above under Action 703, the mobile station may have received some information (through USF_ALLOC) regarding which of the corresponding uplink radio blocks to use, all or a subset thereof. In other words, the packet data are transmitted on all or only a subset of corresponding uplink radio blocks.

Furthermore, as also mentioned in the foregoing, there are two main cases of how the downlink radio blocks, and thereby also the corresponding uplink radio blocks, may be transmitted, namely on two or more PDCHs on different timeslots during the same 20 millisecond radio block period or two or more consecutive radio blocks on the same PDCH, that is, on the same timeslot number. In some embodiments the two cases may be combined and used simultaneously. The two cases are explained in some detail below in connection with FIGS. 9-13.

As mentioned above under Action 702, an example of an assignment and interpretation table that may be formed in Action 702 will now be discussed with reference to the table shown in FIG. 8.

The table shows an example of a full USF combination mapping that may be stored by the GSM network 100 in a situation where the E-USF comprises a combination of two USF values. In other embodiments more than two USF values may form each combination. There are basically two ways of sending the USF values of the combination to the mobile stations, namely on parallel PDCHs (different time slots) in the same radio block period, or on the same PDCH (timeslot) on two consecutive radio block periods. This will be discussed and exemplified in further detail below under Action 707. The shown mapping in FIG. 8 is for a case using parallel PDCHs and hence the first and second radio blocks correspond to a first and second timeslot (PDCH). Although the principle is the same, the combination mapping may need to be adapted in case the combination of USF values is to be sent in consecutive radio blocks, at least when legacy mobile stations are present, for reasons that are elaborated in connection with Action 707 below.

Of course, each individual mobile station, including the mobile station 120, only has to store information on the USF combination(s) assigned to it. (How the GSM network 100 may signal the assigned USF combination to the mobile station 120 is discussed under Action 703 below.)

Each row in the table corresponds to a first USF value (numbered 0 to 7) of the combination, sent on a first of two timeslots, and each column to a second USF value of the combination, sent on a second timeslot (also numbered 0 to 7). For each USF combination, the table has two table cells, identifying a mobile station allowed to send on the first and second corresponding uplink timeslot, respectively. Legacy mobile stations not supporting E-USF are denoted L0, L1, L2 and L3. Mobile stations supporting E-USF according to embodiments herein are denoted N0, N1, . . . , N59. The mobile station 120 may correspond to any one of these mobile stations. For example, the USF combination (3,3) allows the mobile station N14 to transmit on the first uplink timeslot, and the MS N15 to transmit on the second uplink timeslot.

Figure 8:
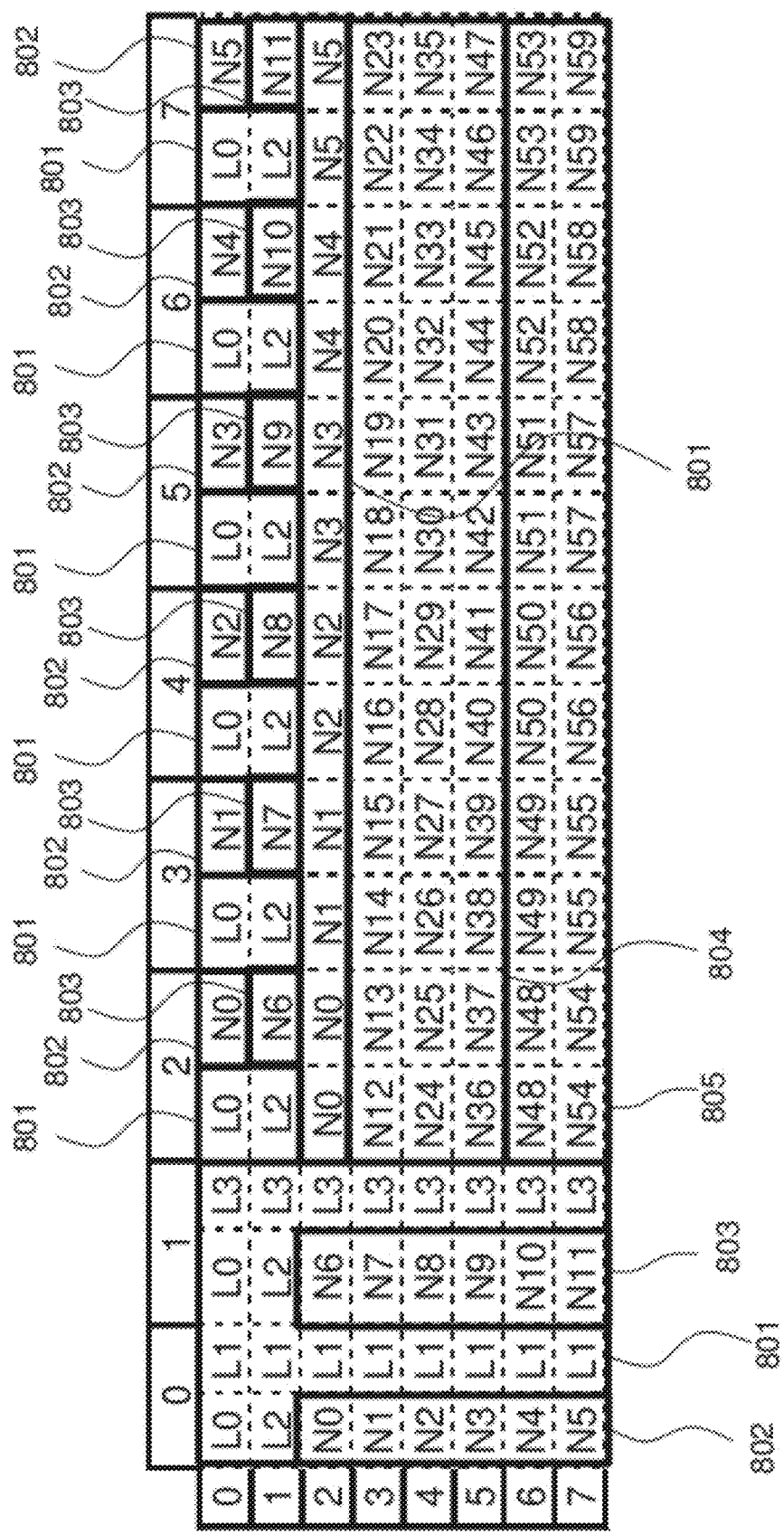
FIG. 8 is an example of an assignment and interpretation table of USF values, including both combinations of USF values for joint interpretation (E-USF) and conventional, single USF values.

Different types of USF assignments has been marked up in FIG. 8 to increase readability.

The group marked 801 contains legacy mobile stations. These mobile stations will read and interpret a received USF independently without considering the USF on the other timeslot. For example, the mobile station L1 has been assigned USF value 0 on timeslot 2. Consequently, each cell in the table corresponding to this USF value says that mobile station L1 is allowed to transmit on the second uplink timeslot, regardless of the USF value on the first timeslot.

The group marked 802 denotes mobile stations supporting E-USF and which have been assigned three different USF combinations for full flexibility. For example, the mobile station N0 is allowed to transmit on the first timeslot if it receives USF combination (2,0), on the second timeslot if it receives USF combination (0,2) and on both timeslots if it receives USF combination (2,2).

The group marked 803 denotes mobile stations supporting E-USF and which mobile stations have been assigned two different USF combinations. These mobile stations can be scheduled to transmit either on the first or second timeslot, but not both. For example, mobile station N6 will transmit on the first timeslot for USF combination (2,1) and on the second timeslot for USF combination (1,2).

The group marked 804 denotes mobile stations supporting E-USF and which mobile stations have been assigned one USF combination that allows them to transmit on one uplink timeslot. For example, mobile station N12 will transmit on the first uplink timeslot if it receives USF combination (3,2). The same USF combination also allows mobile station N13 to transmit on the second uplink timeslot.

The group marked 805 denotes mobile stations supporting E-USF and which mobile stations have been assigned one USF combination that allows them to transmit on two uplink timeslots. For example, mobile station N48 will transmit on both uplink timeslots if it receives USF combination (6,2).

Hence, the table shows an example where assignment of (single) USF values to legacy mobile stations and assignment of combinations of USF values to mobile stations supporting E-USF according to embodiments herein have been coordinated. The coordination has been performed so that combination of USF values that comprise USF values are also assigned to legacy mobile stations. This enables multiplexing with legacy mobile stations supporting only legacy methods, and also avoid collisions in the uplink. FIG. 6, referred to above, shows, as an example, some of the mobile stations in the table of FIG. 8.

In the table example of FIG. 8, in total 64 mobile stations (60 mobile stations supporting joint interpretation of combined USF values according to embodiments herein and 4 legacy mobile stations) are multiplexed onto the two timeslots. With the legacy dynamic allocation method, only 16 mobile stations (eight per timeslot) can be multiplexed.

If no legacy mobile stations are present, up to 128 mobile stations that support E-USF can be multiplexed on two timeslots, since there are 8*8*2=128 table cells in the table. For each legacy mobile station present, this number will be reduced by eight. Another example: If three USFs on parallel downlink timeslots are coupled, up to 8*8*8*3=1536 mobile stations can share the corresponding downlink timeslots, if no legacy mobile station is present. Each legacy mobile station will reduce this number by 64.

Figure 9:
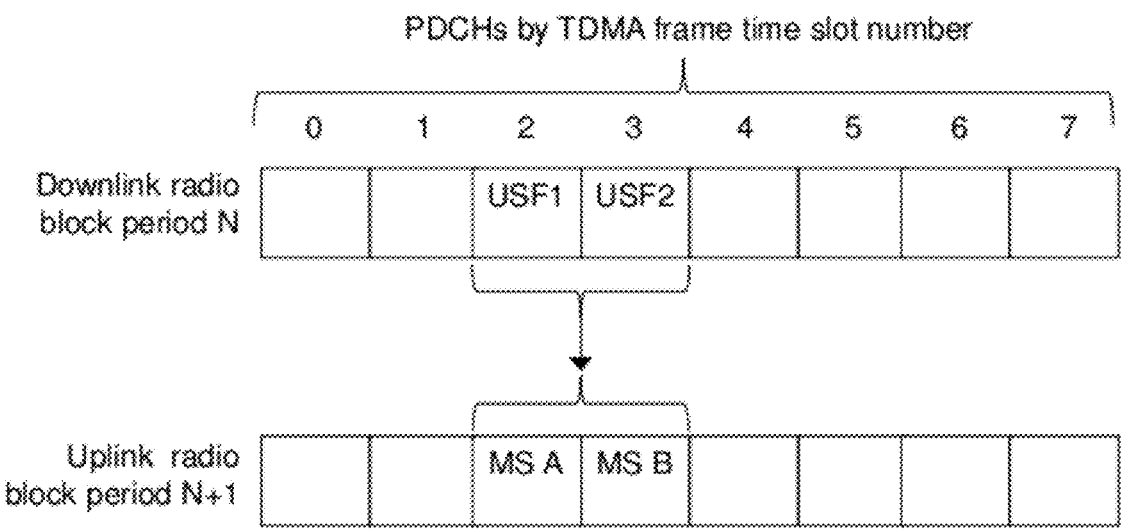
FIG. 9 shows dynamic allocation with a combination of USF values (E-USF) on parallel timeslots.

The case where two USF values on parallel PDCHs within the same radio block period are coupled is illustrated in FIG. 9 in a situation corresponding to Dynamic Allocation (DA). In this example, the USFs on timeslot 2 and 3 are coupled, that is, are to be jointly interpreted, forming the E-USF. During TBF assignment, corresponding to action 703 above, the GSM network 100 has signaled this information to mobile stations MS A and MS B assigned PDCHs on timeslot 2 and 3. Any one of the mobile stations MS A and MS B may correspond to the mobile station 120. The GSM network 100 has also assigned one or more USF combination(s) (E-USF) to these mobile stations. In the shown example both mobile station MS A and MS B have been assigned the same E-USF on timeslots 2 and 3. For each assigned USF combination, the GSM network 100 decides its interpretation, i.e., on which of the corresponding uplink timeslots (in the example, timeslot 2 and 3) the respective mobile station is allowed to transmit. This information is also signaled to the mobile stations MS A, MS B during TBF assignment (see e.g. USF_ALLOC discussed under Action 703 above).

The mobile stations MS A, MS B read the USF values and interpret them jointly (corresponding to Action 706 above). If a mobile station receives an USF combination that it has been assigned, the mobile station transmits radio blocks on the uplink timeslot(s) according to the previously received interpretation. In the shown example, mobile station MS A is allowed to transmit on the lower (timeslot 2) corresponding uplink timeslot and mobile station MS B on the higher (timeslot 3) corresponding uplink timeslot.

Figure 10:
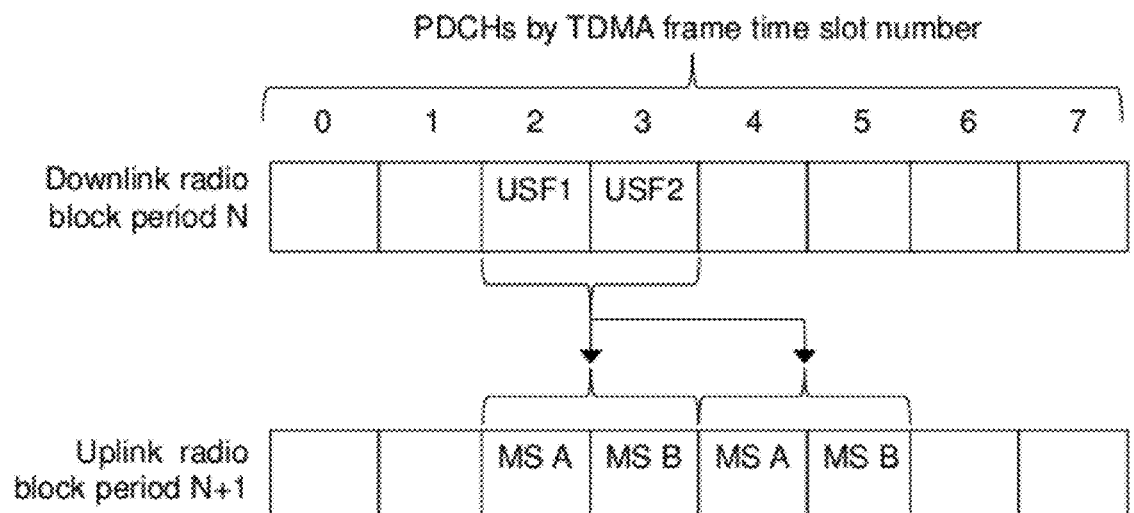
FIG. 10 shows extended dynamic allocation with a combination of USF values (E-USF) on parallel timeslots.

Another variant of the case where two USFs on parallel timeslots are coupled is illustrated in FIG. 10, in a situation corresponding to Extended Dynamic Allocation (EDA). In this example, the USF values on timeslot 2 and 3 are coupled, that is, are forming the E-USF. The mobile stations MS A, MS B are assigned the four uplink timeslots 2, 3, 4 and 5. The extension of the solution for DA to the case of EDA is straightforward. If a mobile station receives its assigned combination of USF values, it is allowed to transmit on the corresponding uplink timeslots, as in the case of DA, but also on the higher numbered pairs (in general: groups) of uplink timeslots, as illustrated in FIG. 10. The change to the legacy, that is, conventional, EDA operation is that the mobile station has to monitor two or more corresponding downlink time slots to read the assigned combination of USF values.

Special consideration may be needed for legacy mobile stations in this case, since they do not consider uplink timeslot pairs (groups) but individual uplink timeslots. Therefore, the USF combination interpretation table, such as discussed above in connection with FIG. 8, should be defined in such a way that new mobile stations (that is, such supporting joint interpretation of USF values) and legacy mobile stations are not mixed in the table cells that correspond to a certain combination of USF values. In addition to that, the normal USF scheduling principles of EDA should be followed to avoid collisions between legacy mobile stations.

Figure 11:
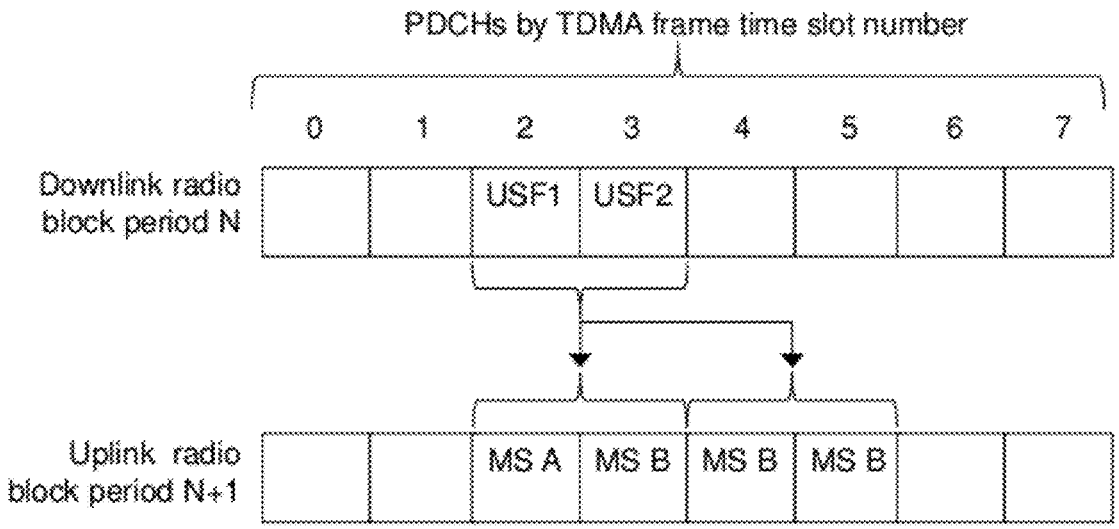
FIG. 11 shows an alternative implementation of extended dynamic allocation with a combination of USF values (E-USF) on parallel timeslots.

An alternative implementation of EDA using combination of USF values is to allow for only one of the mobile stations scheduled by the combination of USF values to transmit on the PDCHs with higher timeslot numbers in the TDMA frame, similar to the implementation today, as shown in FIG. 11. Using this approach the mobile stations transmitting on the higher timeslot number, here mobile station MS B, could be a legacy mobile station with mobile station MS A being either a legacy mobile station or a mobile station supporting E-USF.

Figure 12:
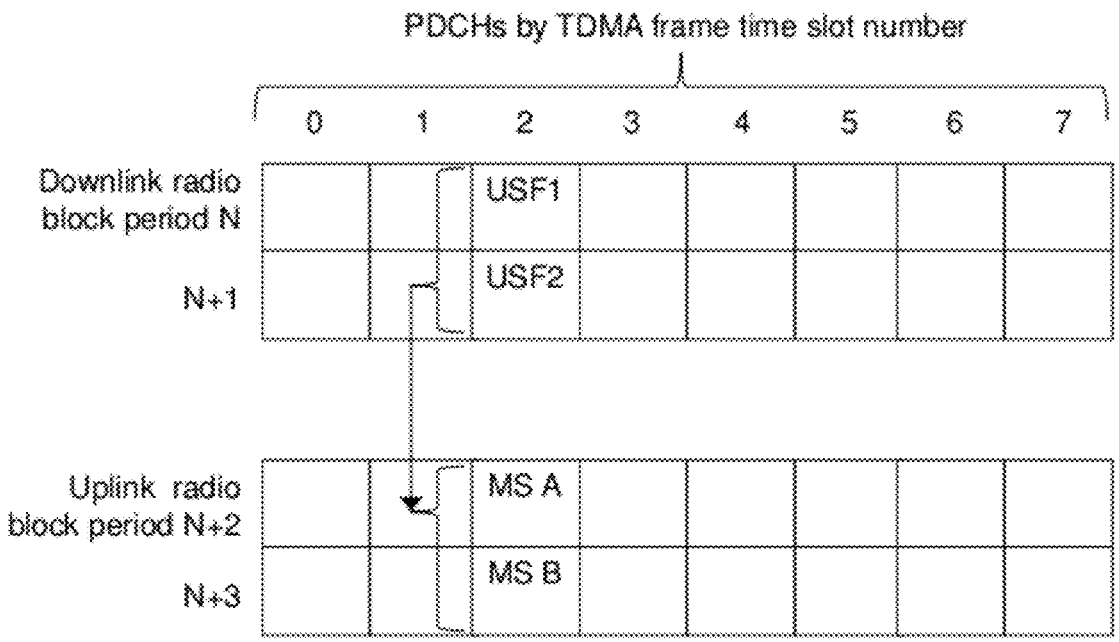
FIG. 12 shows dynamic allocation with a combination of USF values (E-USF) in consecutive radio blocks.

The case where two USF values in consecutive radio blocks are coupled for joint interpretation is illustrated in FIG. 12. In this example, the USF values on radio block period N and N+1 on timeslot 2 are coupled, that is, are forming the E-USF. In general, the underlying principle and solution is similar to the case of parallel PDCHs within the same radio block period. The main difference being that the USF values transmitted on two (or more) consecutive radio blocks on one timeslot are to be jointly interpreted instead of those on different timeslots in the same radio block period. The combination of USF values in these radio blocks allows the mobile station to transmit in the allocated uplink radio blocks on the corresponding timeslot. Since the mobile station must read two consecutive radio blocks before it can interpret the combination of USF values, the delay from transmission of the USF values to transmission of uplink radio blocks is in this case two radio block periods instead of one.

Figure 13:
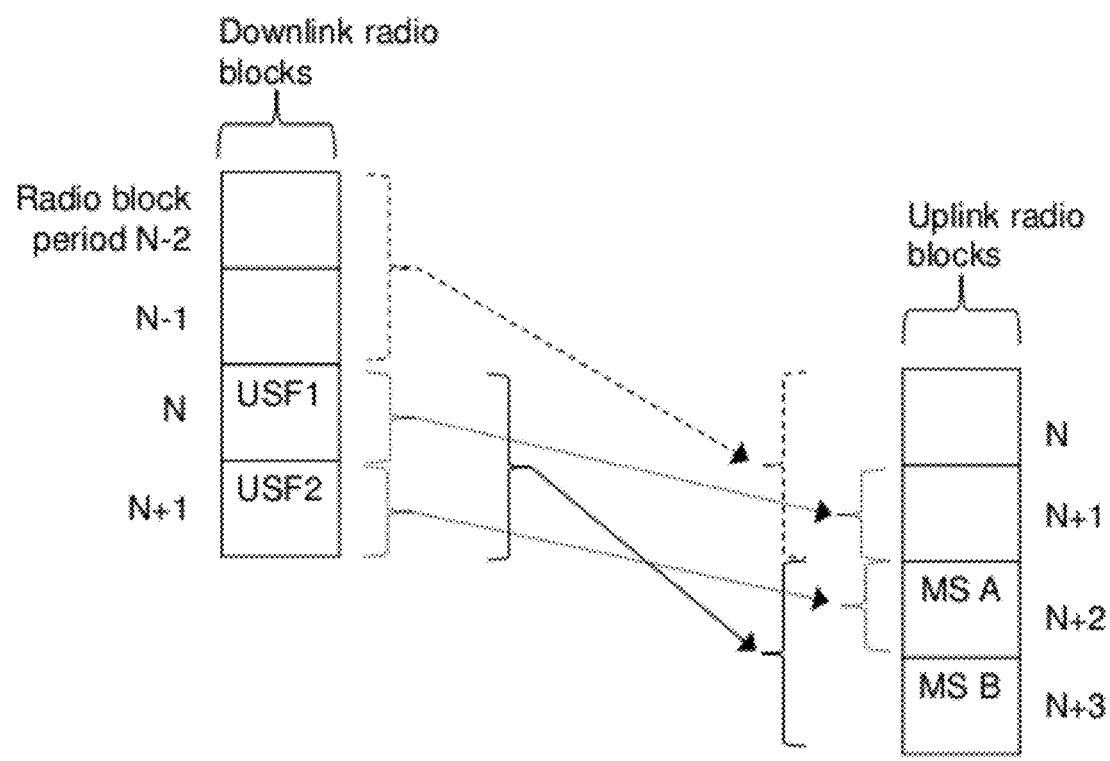
FIG. 13 shows USF scheduling delay for a combination of USF values for joint interpretation (E-USF) and a conventional, single USF value.

The USF combination interpretation table may be similar to the table discussed above in connection with FIG. 8, however, the fact that the delay is two radio block periods for mobile stations supporting E-USF and one for legacy mobile stations, needs special consideration. The situation is illustrated in FIG. 13. Note that the USF value in downlink radio block N, if assigned to a legacy mobile station, allows transmission in uplink radio block period N+1, which is scheduled by the USF values of downlink radio block periods (N-2, N-1) when coupled USF values for joint interpretation (E-USF) are used. The proposed solution is as follows (with radio block period numbers according to the figure):

If a USF value assigned to a legacy mobile station is sent in radio block period N (being the first of two coupled consecutive radio blocks), the USF combination sent in radio block periods N-2 and N-1 (the previous USF couple) should not allow transmission for any mobile station supporting E-USF during uplink radio block period N+1. Consequently, some cells in the USF combination interpretation table (corresponding to uplink radio block period N+1) should be left empty.

Figure 14:
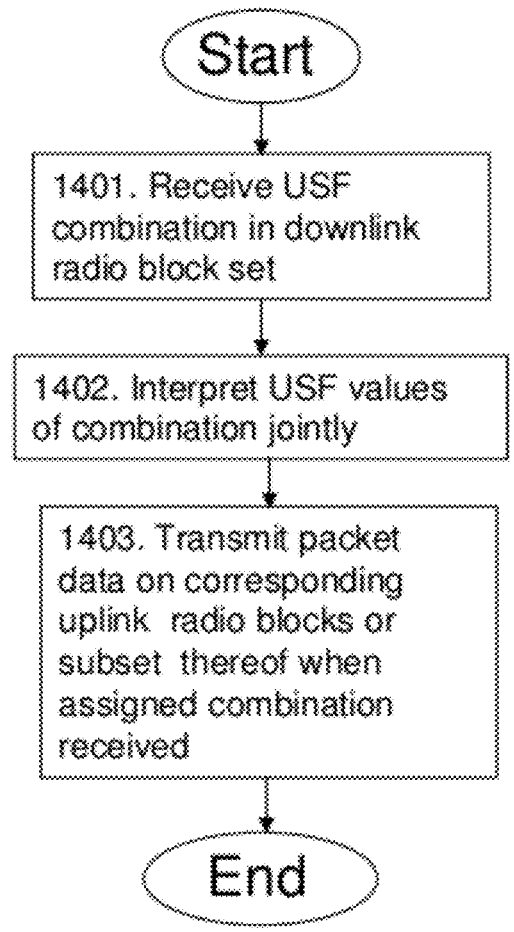
FIG. 14 is a flow chart illustrating embodiments of a method in a mobile station.

Embodiments herein relating to a method in the mobile station 120 for enabling more than eight mobile stations to share one uplink PDCH in the GSM network 100 will now be further elaborated and described with reference to the flowchart depicted in FIG. 14. As mentioned above, the mobile station 120 is comprised in the GSM network 100 and the GSM network 100 communicates with the mobile station 120 through the base station 110, also comprised in the GSM network 100. The base station 100 is typically, at least partly, controlled by a Base Station Controller (BSC), not shown, also comprised in the GSM network 100. The method comprises the following actions, which actions may be taken in any suitable order:

In action 1401, the mobile station 120 receives a combination of USF values in a set of two or more downlink radio blocks. This action may correspond fully or partially to the previously described action 705.

In action 1402, the mobile station 120 jointly interprets the received USF values of the combination. This action may correspond fully or partially to the previously described action 706.

In action 1403, the mobile station 120 transmits packet data only when an assigned combination of USF values has been received. This action may correspond fully or partially to the previously described action 707.

The set of downlink radio blocks may be predefined.
The set of downlink radio blocks may further be received on either one or a combination of:
  two or more Packet Data Channels (PDCHs) on different timeslots in a Time Division Multiple Access (TDMA) frame during the same 20 millisecond radio block period; and
  two or more consecutive radio blocks on the same PDCH.
    In some embodiments the packet data is transmitted on all or only a subset of corresponding uplink radio blocks.

In some embodiments, the mobile station 120 has been assigned more than one assigned combination of USF values, thereby allowing the mobile station 120 to transmit on different subsets of the corresponding uplink radio blocks.

Figure 15:
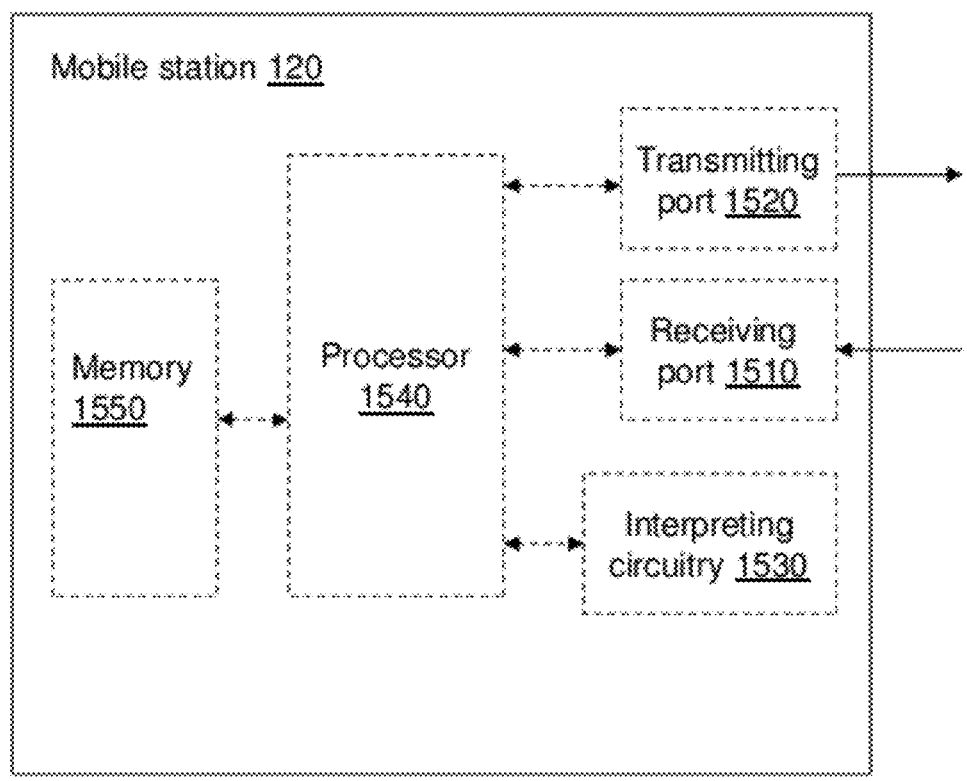
FIG. 15 is a schematic block diagram showing embodiments of a mobile station. station.

To perform the actions above for enabling more than eight mobile stations to share one uplink Packet Data Channel in the GSM network 100, the mobile station 120 may comprise an arrangement schematically depicted in FIG. 15. The mobile station 120 is comprised in the GSM network 100 and the GSM network 100 communicates with the mobile station 120 through the base station 110, also comprised in the GSM network 100. The base station 110 is typically, at least partly, controlled by the Base Station Controller (BSC), not shown, also comprised in the GSM network 100.

The mobile station 120 is configured to receive a combination of USF values in a set of two or more downlink radio blocks. The mobile station 120 may comprise a receiving port 1510 that is configured to receive said combination of USF values in the set of two or more downlink radio blocks. The mobile station 120 is further configured to jointly interpret the received USF values of the combination. The mobile station 120 may comprise an interpreting circuitry 1530 that is configured to jointly interpret said received USF values of the combination. Moreover, the mobile station 120 is configured to transmit packet data only when an assigned combination of USF values has been received. The mobile station 120 may comprise a transmitting port 1520 that is configured to transmit said packet data only when the assigned combination of USF values has been received.

The set of downlink radio blocks may be predefined.

The mobile station 120, or the receiving port 1510 of the mobile station 120, may be further configured to receive the predefined set of downlink radio blocks on either one or a combination of:
- two or more Packet Data Channels on different timeslots in a TDMA frame during the same 20 millisecond radio block period; and
- two or more consecutive radio blocks on the same PDCH.

In some embodiments, the mobile station 120, or the transmitting port 1520 of the mobile station 120, is further configured to transmit the packet data on all or only a subset of corresponding uplink radio blocks.

In some embodiments, the mobile station 120 has been assigned more than one assigned combination of USF values, thereby allowing the mobile station 120 to transmit on different subsets of the corresponding uplink radio blocks.

The embodiments of the mobile station 120 may be implemented through one or more processors, such as a processor 1540 in the mobile station 120 depicted in FIG. 15, together with computer program code for performing the functions and actions of embodiments herein.

The program code mentioned above may also be provided as a computer program product, for instance in the form of a data carrier carrying computer program code for performing the embodiments herein when being loaded into the mobile station 120. One such carrier may be in the form of a CD ROM disc. It is however feasible with other data carriers such as a memory stick or memory card. The computer program code may furthermore be provided as pure program code on, and downloadable from, a server.

The mobile station 120 may further comprise a memory 1550 comprising one or more memory units. The memory 1550 may be arranged to be used to store data, contact information to other nodes in the GSM network 100, configurations and applications to perform the methods herein when being executed in the mobile station 120.

Those skilled in the art will appreciate that the receiving port 1510, the transmitting port 1520 and the interpreting circuitry 1530 described above may refer to a combination of analog and digital circuits, and/or one or more processors configured with software and/or firmware (e.g., stored in memory) that, when executed by the one or more processors such as the processor 1540, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 16:
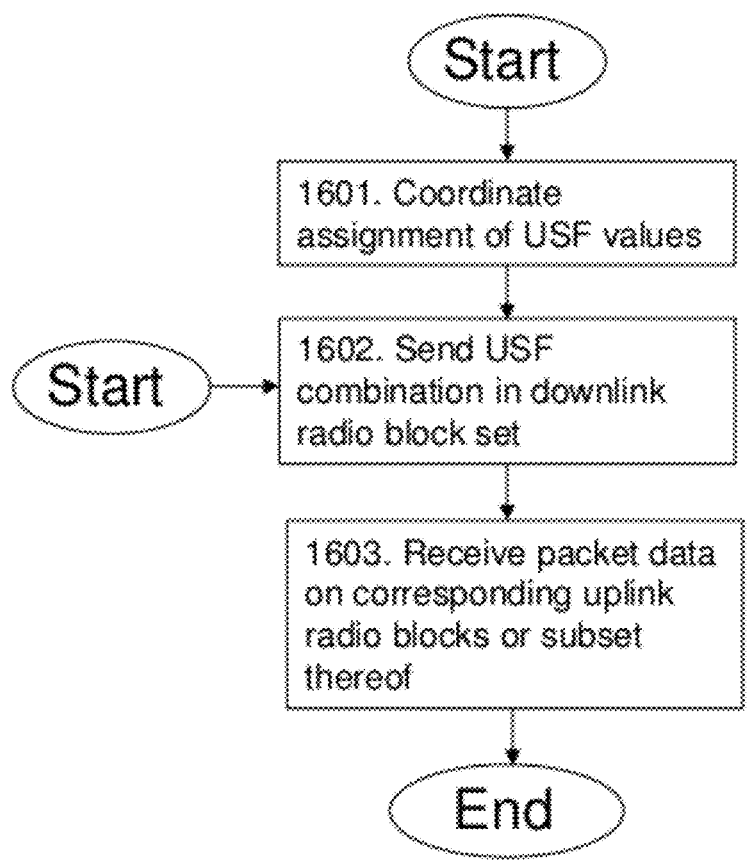
FIG. 16 is a method illustrating embodiments of a method in a GSM network.

Embodiments herein relating to a method in the GSM network 100 for enabling more than eight mobile stations to share one uplink PDCH in the GSM network 100 will now be further elaborated and described with reference to the flowchart depicted in FIG. 16. As mentioned above, the mobile station 120 is comprised in the GSM network 100 and the GSM network 100 communicates with the mobile station 120 through the base station 110, also comprised in the GSM network 100. The base station 110 is typically, at least partly, controlled by a Base Station Controller (not shown), also comprised in the GSM network 100. The method comprises the following actions, which actions may be taken in any suitable order:

In action 1601, which is an optional action for embodiments herein, the GSM network 100, typically the BSC thereof, coordinates assignment of USF values to mobile stations, such as the legacy mobile stations 121-1, 121-2, not supporting joint interpretation of combined USF values with mobile stations, such as the mobile station 120 and mobile stations 120-1, 120-2, supporting joint interpretation of combined USF values, so that combinations of USF values are also assigned to the mobile stations not supporting joint interpretation of combined USF values.

This action may correspond partially to the previously described action 702.

In action 1602, the GSM network 100, typically the base station 110 thereof, sends to the mobile station 120 a combination of USF values in a set of two or more downlink radio blocks, the USF values of the combination to be jointly interpreted by the mobile station 120.

This action may correspond fully or partially to the previously described action 705.

In action 1603, the GSM network 100, typically the base station 110 thereof, receives packet data from the mobile station 120 in response to that the mobile station 120 has received and jointly interpreted the sent USF values of the combination and transmitted the packet data only when an assigned combination of USF values was received.

This action may correspond fully or partially to the previously described action 707.

The set of downlink radio blocks may be predefined.

The set of downlink radio blocks may be sent to the mobile station 120 on either one or a combination of:
- two or more PDCHs on different timeslots in a TDMA frame during the same 20 millisecond radio block period; and
- two or more consecutive radio blocks on the same PDCH.

In some embodiments the packet data is received on all or only a subset of corresponding uplink radio blocks.

In some embodiments the GSM network 100, typically the base station 110 thereof, sends to the mobile station 120 more than one assigned combination of USF values, thereby allowing the mobile station 120 to transmit on different subsets of the corresponding uplink radio blocks.

Figure 17:
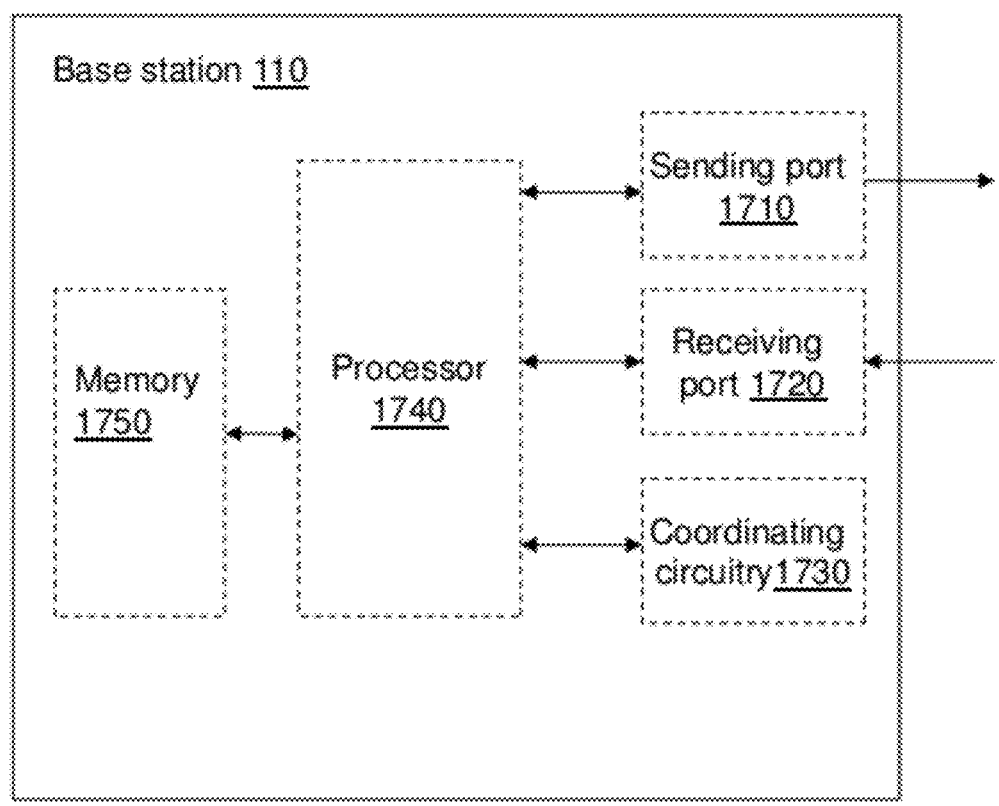
FIG. 17 is a schematic block diagram showing embodiments of a base station of a GSM network.

To perform the actions above for enabling more than eight mobile stations to share one uplink Packet Data Channel in the GSM network 100, a node or entity, typically the base station 110, of the GSM network 100 may comprise an arrangement schematically depicted in FIG. 17. The mobile station 120 is comprised in the GSM network 100 and the GSM network 100 communicates with the mobile station 120 through the base station 110, also comprised in the GSM network 100. The base station 110 is typically, at least partly, controlled by a Base Station Controller, BSC, (not shown), also comprised in the GSM network 100.

The GSM network 100, typically a sending port 1710 of the base station 110, is configured to send, to the mobile station 120, a combination of USF values in a set of two or more downlink radio blocks, the USF values of the combination to be jointly interpreted by the mobile station 120. The GSM network 100, typically a receiving port 1720 of the base station 110, is further configured to receive packet data, from the mobile station 120, in response to that the mobile station 120 has received and jointly interpreted the sent USF values of the combination and transmitted the packet data only when an assigned combination of USF values has been received.

The set of downlink radio blocks may be predefined.

The GSM network 100, typically the sending port 1710 of the base station 110, may be further configured to send the predefined set of downlink radio blocks to the mobile station 120 on either one or a combination of:
- two or more Packet Data Channels on different timeslots in a Time Division Multiple Access frame during the same 20 millisecond radio block period; and
- two or more consecutive radio blocks on the same Packet Data Channel.

In some embodiments, GSM network 100, typically the receiving port 1720 of the base station 110, is further configured to receive the packet data on all or only a subset of corresponding uplink radio blocks.

In some embodiments, the GSM network 100, typically the typically the sending port 1710 of the base station 110, is further configured to send, to the mobile station 120, more than one assigned combination of USF values, thereby allowing the mobile station to transmit on different subsets of the corresponding uplink radio blocks.

In some embodiments the GSM network 100, typically a coordinating circuitry 1730 comprised in the BSC (not shown) of the base station 110, or comprised in the base station 110 of the GSM network 100 as in the shown example, is further configured to coordinate assignment of USF values to mobile stations, such as the legacy mobile stations 121-1, 121-2, not supporting joint interpretation of combined USF values with mobile stations, such as the mobile station 110 and mobile stations 120-1, 120-2, supporting joint interpretation of combined USF values, so that USF combinations are also assigned to the mobile stations 121-1, 121-2 not supporting joint interpretation of combined USF values.

The embodiments of the GSM network 100, may be implemented through one or more processors, such as a processor 1740 in the base station 110 depicted in FIG. 17 and/or a corresponding processor in the BSC (not shown), together with computer program code for performing the functions and actions of embodiments herein.

The program code mentioned above may also be provided as a computer program product, for instance in the form of a data carrier carrying computer program code for performing the embodiments herein when being loaded into a node or entity of the GSM network 100, such as the base station 110 and/or the BSC (not shown). One such carrier may be in the form of a CD ROM disc. It is however feasible with other data carriers such as a memory stick or memory card. The computer program code may furthermore be provided as pure program code on, and downloadable from, a server.

The embodiments of the GSM network 100 may further comprise memory, such as a memory 1750 comprising one or more memory units in the base station 110, as depicted in FIG. 17 and/or corresponding memory in the BSC (not shown). The memory 1750 may be arranged to be used to store data, contact information to other nodes in the GSM network 100, configurations and applications to perform the methods herein when being executed in the base station 110.

Those skilled in the art will appreciate that the sending port 1710, the receiving port 1720 and the coordinating circuitry 1730 described above may refer to a combination of analog and digital circuits, and/or one or more processors configured with software and/or firmware (e.g., stored in memory) that, when executed by the one or more processors such as the processor 1740, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

DETAILED EXAMPLE 1

Figure 18:
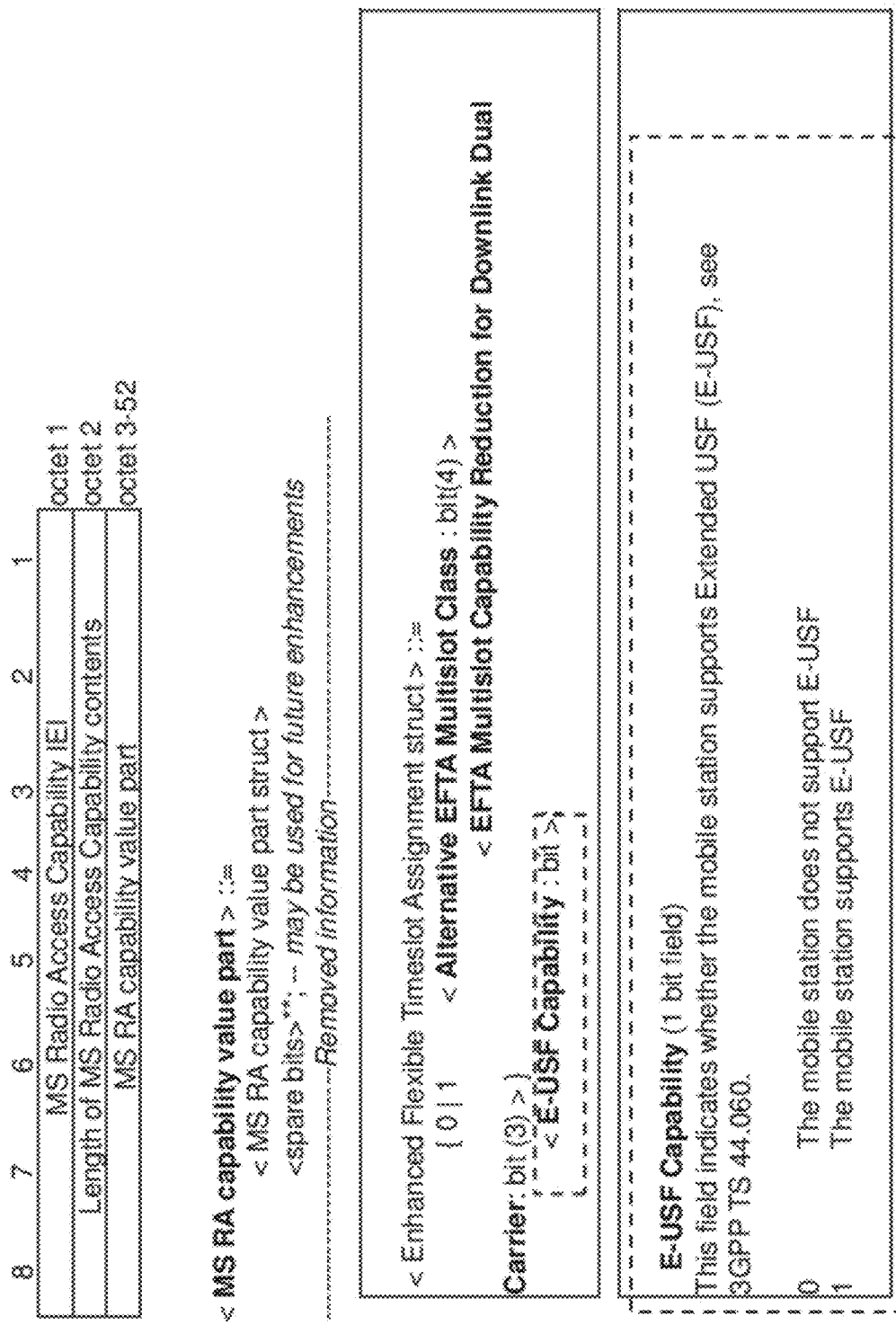
FIG. 18 is an example of modification to the "MS Radio Access Capability information element" for E-USF capability signalling.

For context, see Action 701 discussed above in connection with FIG. 7. One example of how the mobile station 120 can signal its capability of handling E-USF (joint interpretation of USF values) to the GSM network 100, is by using a E-USF capability indication in the MS Radio Access capability Information Element according to the 3GPP TS 24.008. See "10.5.5.12a MS Radio Access capability", supplemented by FIG. 18 showing the "MS Radio Access Capability Information Element" according to Figure 10.5.128a of 3GPP TS 24.008 and Table 10.5.146 of 3GPP TS 24.008, showing possible E-USF capability signaling additions marked up by squares of dotted lines.

DETAILED EXAMPLE 2

For context, see Action 701 discussed above in connection with FIG. 7. One example of when the mobile station 120 can signal is capability of handling E-USF (joint interpretation of USF values) to the GSM network 100, is when requesting radio resources for uplink transmission, e.g. during the One Phase Access procedure (see 3GPP TS 44.018) by modifying the contents of the 3GPP TS 44.060 EGPRS PACKET CHANNEL REQUEST message, which can be modified by using one of the currently unused code points. It shall be noted that this approach can also be used when indicating a more general support for extended identifiers on the RLC/MAC layer.

See the 3GPP TS 44.060 EGPRS PACKET CHANNEL REQUEST message supplemented by FIG. 19 showing "Table 11.2.5a.1 and 0.2: EGPRS PACKET CHANNEL REQUEST message content" with possible modification marked by a square of dotted lines. For further details e.g. regarding the MultislotClass (5 bit field) and MultislotClassGroup (3 bit field), see "Table 11.2.5a.3: EGPRS PACKET CHANNEL REQUEST message details".

DETAILED EXAMPLE 3

For context, see Action 703 discussed above in connection with FIG. 7. One example of how the GSM network 100 can inform the mobile station 120 about the combination of USF values (E-USF) it has been assigned, is by modification of the 3GPP TS 44.018 "PACKET UPLINK ASSIGNMENT". See FIG. 20 showing the 3GPP TS 44.018 "PACKET UPLINK ASSIGNMENT" message with a suggested modification, marked by a square of dotted lines, for adding the additional USF value, USF_EXT. The message is part of the information element IA Rest Octets (44.018, clause 10.5.2.16) in the message IMMEDIATE ASSIGNMENT sent in the CCCH (Common Control Channel), which message also comprises the information element Packet Channel Description (44.018, clause 10.5.2.25a) that in turn comprise information about the PDCH, timeslot number 0-7.

When 3GPP documents relating to the GSM standard have been referred to in the foregoing, the following versions, which were released in December 2010, are relevant: 24.008 version 9.5.0, 44.018 version 9.7.0, 44.060 version 9.6.0 and 45.002 version 9.4.0.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method in a mobile station for enabling more than eight mobile stations to share one uplink Packet Data Channel in a Global System for Mobile Communications (GSM) network, wherein the method comprises:
   receiving two or more legacy Uplink State Flag (USF) values in respective downlink radio blocks in a set of two or more downlink radio blocks, each legacy USF value being one in a defined set of legacy USF values that are individually usable by legacy mobile stations that are not configured to jointly interpret the legacy USF values;
   jointly interpreting the two or more legacy USF values as a received combined USF value, formed as a combination of the two or more legacy USF values;
   determining whether the received combined USF value matches an assigned combined USF value that has been assigned to the mobile station, said assigned combined USF value comprising a unique combination of two or more of the legacy USF values from the defined set of legacy USF values; and
   transmitting packet data only when the received combined USF value matches the assigned combined USF value;
   wherein the assigned combined USF value is one among two or more assigned combined USF values that have been assigned to the mobile station, each assigned combined USF value having a different corresponding subset of uplink radio blocks, and wherein transmitting the packet data comprises transmitting the packet data on the subset of uplink radio blocks corresponding to the assigned combined USF value matching the received combined USF value.

2. The method of claim 1, wherein receiving the two or more legacy USF values in the respective downlink radio blocks in the set of two or more downlink radio blocks comprises receiving the two or more legacy USF values in a predefined set of two or more downlink radio blocks.

3. The method of claim 1, further comprising receiving the set of two or more downlink radio blocks on one or a combination of:
   two or more Packet Data Channels on different timeslots in a Time Division Multiple Access frame during one 20 millisecond radio block period, and two or more consecutive radio blocks on one Packet Data Channel; and
   wherein transmitting the packet data comprises transmitting the packet data on all or only a subset of uplink radio blocks corresponding to the set of two or more downlink radio blocks.

4. A method in a Global System for Mobile Communications (GSM) network for enabling more than eight mobile stations to share one uplink Packet Data Channel in the GSM network, wherein the method comprises:
   determining that a mobile station supports joint interpretation of legacy Uplink State Flag (USF) values, each legacy USF value being one in a defined set of legacy USF values that are individually usable by legacy mobile stations that are not configured to jointly interpret the legacy USF values;
   assigning more than one unique combination of legacy USF values to the mobile station as respective assigned combined USF values, where each assigned combined USF value corresponds to a different subset of uplink radio blocks, and controlling the subsets of uplink radio blocks transmitted on by the mobile station by transmitting selected ones of the assigned combined USF values to the mobile station, wherein each assigned combined USF value comprises a unique combination of two or more of the legacy USF values; and
   indicating an uplink transmission opportunity to the mobile station by transmitting the two or more legacy USF values comprising one of the assigned combined USF value in respective downlink radio blocks in a set of two or more downlink radio blocks.

5. The method of claim 4, wherein the set of two or more downlink radio blocks comprises a predefined set of two or more downlink radio blocks.

6. The method of claim 4, further comprising transmitting the set of two or more downlink radio blocks on either one or a combination of:
   two or more Packet Data Channels on different timeslots in a Time Division Multiple Access frame during one 20 millisecond radio block period, and two or more consecutive radio blocks on one Packet Data Channel; and
   wherein the method further includes receiving packet data from the mobile station on all or only a subset of uplink radio blocks corresponding to the set of two or more downlink radio blocks.

7. The method of claim 4, further comprising assigning one of the legacy USF values comprising a given one of the assigned combined USF values to a legacy mobile station, such that said legacy USF value is used individually to indicate transmission opportunities to the legacy mobile station and is used jointly in the given one of the assigned combined USF values to indicate transmission opportunities to the mobile station.

8. A mobile station for enabling more than eight mobile stations to share one uplink Packet Data Channel in a Global System for Mobile Communications (GSM) network, wherein the mobile station comprises:
   a receiver configured to receive two or more legacy Uplink State Flag (USF) values in respective downlink radio blocks in a set of two or more downlink radio blocks, each legacy USF value being one in a defined set of legacy USF values that are individually usable by legacy mobile stations that are not configured to jointly interpret the legacy USF values; and
   a processor circuit operatively associated with the receiver and configured to:
      jointly interpret the two or more legacy USF values as a received combined USF value, formed as a combination of the two or more legacy USF values;
      determine whether the received combined USF value matches an assigned combined USF value that has been assigned to the mobile station, said assigned combined USF value comprising a unique combination of two or more of the legacy USF values from the defined set of legacy USF values; and
      transmit packet data via a transmitter of the mobile station, when the received combined USF value matches the assigned combined USF value;
   wherein the assigned combined USF value is one among two or more assigned combined USF values that have been assigned to the mobile station, each assigned combined USF value having a different corresponding subset of uplink radio blocks, and wherein the mobile station is configured to transmit the packet data on the subset of uplink radio blocks corresponding to the assigned combined USF value matching the received combined USF value.

9. The mobile station of claim 8, wherein the mobile station is configured to receive the two or more legacy USF values in a predefined set of two or more downlink radio blocks.

10. The mobile station of claim 8, wherein the mobile station is configured to receive the set of two or more downlink radio blocks on one or a combination of:
   two or more Packet Data Channels on different timeslots in a Time Division Multiple Access frame during one 20 millisecond radio block period, and two or more consecutive radio blocks on one Packet Data Channel; and
   wherein the mobile station is further configured to transmit the packet data on all or only a subset of uplink radio blocks corresponding to the set of two or more downlink radio blocks.

11. A base station for enabling more than eight mobile stations to share one uplink Packet Data Shared Channel in a Global System for Mobile Communications (GSM) network, wherein the base station comprises:
   a transmitter for transmitting to mobile stations; and
   a processor operatively associated with the transmitter and configured to:
      determine that a mobile station supports joint interpretation of legacy Uplink State Flag (USF) values, each legacy USF value being one in a defined set of legacy USF values that are individually usable by legacy mobile stations that are not configured to jointly interpret the legacy USF values;
      assign more than one unique combination of legacy USF values to the mobile station as respective assigned combined USF values, where each assigned combined USF value corresponds to a different subset of uplink radio blocks, and wherein the processor is further configured to control the subsets of uplink radio blocks transmitted on by the mobile station by transmitting selected ones of the assigned combined USF values to the mobile station, and whereing each assigned combined USF value comprises a unique combination of two or more of the legacy USF values; and
      indicate an uplink transmission opportunity to the mobile station by transmitting the two or more legacy USF values comprising the assigned combined USF value in respective downlink radio blocks in a set of two or more downlink radio blocks.

12. The base station of claim 11, wherein the set of two or more downlink radio blocks comprises a predefined set of two or more downlink radio blocks.

13. The base station of claim 11, wherein the base station is configured to transmit the set of two or more downlink radio blocks on either one or a combination of:
   two or more Packet Data Channels on different timeslots in a Time Division Multiple Access frame during one 20 millisecond radio block period, and two or more consecutive radio blocks on one Packet Data Channel; and
   wherein the base station is further configured to receive, via a receiver of the base station, packet data from the mobile station on all or only a subset of uplink radio blocks corresponding to the set of two or more downlink radio blocks.

14. The base station of claim 11, wherein the processor is configured to assign one of the legacy USF values comprising a given one of the assigned combined USF value to a legacy mobile station, such that said legacy USF value is used individually to indicate transmission opportunities to the legacy mobile station and is used jointly in the given assigned combined USF value to indicate transmission opportunities to the mobile station.

15. A method at a base station for multiplexing mobile stations onto an Uplink Packet Data Channel (PDCH) in a Global System for Mobile Communication (GSM) network, said method comprising:
   receiving capability information for a first mobile station, indicating that the first mobile station is configured to jointly interpret legacy Uplink State Flag (USF) values, whereby the first mobile station forms combined USF values by combining two or more legacy USF values received by the first mobile station, each legacy USF value taken from a defined set of legacy USF values that are individually usable in the GSM network to identify individual mobile stations multiplexed onto the same uplink PDCH;
   assigning a downlink radio block set of two or more downlink radio blocks to the first mobile station, and assigning a combined USF value to the first mobile station as a unique combination of two or more of the legacy USF values from the defined set of legacy USF values;
   transmitting information to the first mobile station, indicating the assigned downlink radio block set and the assigned combined USF value;
   identifying an uplink transmission opportunity for the first mobile station on the uplink PDCH by transmitting respective ones of the two or more legacy USF values comprising the assigned combined USF value in respective ones of the downlink radio blocks comprising the assigned downlink radio block set; and
   determining that a second mobile station does not support joint interpretation of the legacy USF values, and multiplexing the second mobile station onto the uplink PDCH by assigning a selected one of the legacy USF values from the defined set of legacy USF values to the second mobile station, and identifying transmission opportunities for the second mobile station on the uplink PDCH by transmitting the selected legacy USF value on a selected downlink radio block;
   wherein the selected legacy USF value is one of the legacy USF values comprising the assigned combined USF value of the first mobile station, such that the selected USF value is used for multiplexing the first mobile station onto the uplink PDCH and reused for multiplexing the second mobile station onto the uplink PDCH.

16. A method at a first mobile station configured for operation in a Global System for Mobile Communication (GSM) network, said method comprising:
   transmitting capability information to a base station, indicating that the first mobile station is configured to jointly interpret legacy Uplink State Flag (USF) values, whereby the first mobile station forms combined USF values by combining two or more legacy USF values received by the first mobile station, each such legacy USF value taken from a defined set of legacy USF values that are individually usable in the GSM network to identify individual mobile stations multiplexed onto a same uplink Packet Data Channel (PDCH);
   receiving information from the base station indicating an assigned downlink radio block set of two or more downlink radio blocks, and an assigned combined USF value indicating a unique combination of two or more of the legacy USF values from the defined set of legacy USF values, wherein the received assigned combined USF value is one among two or more assigned combined USF values that have been assigned to the mobile station, each assigned combined USF value having a different corresponding subset of uplink radio blocks; and responsive to detecting that the unique combination of legacy USF values is received in the assigned downlink radio block set, transmitting uplink packet data in one or more uplink radio blocks corresponding to the assigned downlink radio block set, wherein transmitting the packet data comprises transmitting the packet data on the subset of uplink radio blocks corresponding to the assigned combined USF value matching the received combined USF value.

\* \* \* \* \*